(12) United States Patent  
Hatami-Hanza

(10) Patent No.: US 8,775,365 B2  
(45) Date of Patent: *Jul. 8, 2014

(54) INTERACTIVE AND SOCIAL KNOWLEDGE DISCOVERY SESSIONS

(75) Inventor: Hamid Hatami-Hanza, Thornhill (CA)

(73) Assignee: Hamid Hatami-Hanza, Thornhill, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,496

(22) Filed: Nov. 29, 2010

(65) Prior Publication Data

US 2011/0218960 A1   Sep. 8, 2011

Related U.S. Application Data

(60) Provisional application No. 61/311,368, filed on Mar. 7, 2010.

(51) Int. Cl.  
*G06F 17/00* (2006.01)  
*G06F 7/00* (2006.01)

(52) U.S. Cl.  
USPC ............ 707/603; 707/769; 707/944; 707/956

(58) Field of Classification Search  
None  
See application file for complete search history.

(56) References Cited

U.S. PATENT DOCUMENTS

| | | | | |
|---|---|---|---|---|
| 3,460,270 A | * | 8/1969 | Black et al. | 434/228 |
| 6,364,667 B1 | * | 4/2002 | Heinberg et al. | 434/322 |
| 6,377,908 B1 | * | 4/2002 | Ostrowski et al. | 703/2 |
| 6,675,159 B1 | * | 1/2004 | Lin et al. | 1/1 |
| 6,847,979 B2 | * | 1/2005 | Allemang et al. | 707/797 |
| 7,343,365 B2 | * | 3/2008 | Farnham et al. | 715/853 |
| 7,487,166 B2 | * | 2/2009 | Angele et al. | 1/1 |
| 7,873,595 B2 | * | 1/2011 | Singh et al. | 707/603 |
| 7,930,288 B2 | * | 4/2011 | Delgado et al. | 707/707 |
| 8,108,413 B2 | * | 1/2012 | Kar et al. | 707/758 |
| 8,122,031 B1 | * | 2/2012 | Mauro et al. | 707/748 |
| 8,401,980 B2 | * | 3/2013 | Hatami-Hanza | 706/12 |
| 2002/0026435 A1 | * | 2/2002 | Wyss et al. | 707/1 |
| 2002/0178255 A1 | * | 11/2002 | Hobart | 709/224 |
| 2003/0222868 A1 | * | 12/2003 | Raskar et al. | 345/419 |
| 2007/0121843 A1 | * | 5/2007 | Atazky et al. | 379/114.13 |
| 2008/0281710 A1 | * | 11/2008 | Hoal | 705/14 |
| 2009/0171999 A1 | * | 7/2009 | McColl et al. | 707/101 |
| 2009/0204601 A1 | * | 8/2009 | Grasset | 707/5 |
| 2010/0198864 A1 | * | 8/2010 | Ravid et al. | 707/769 |
| 2010/0223258 A1 | * | 9/2010 | Ghahramani et al. | 707/723 |

(Continued)

OTHER PUBLICATIONS

U.S. Appl. No. 12/179,363, filed Jan. 29, 2009, Hamid Hatami-Hanza.

(Continued)

*Primary Examiner* — Kaveh Abrishamkar  
*Assistant Examiner* — James J Wilcox

(57) ABSTRACT

There are provided systems and methods that can assist interactively a knowledge user/contributor to obtain a straight answer to his/her request for knowledge about one or more subject matter, can mediates a large group of unknown inquirers and present them with distilled stage of knowledge related to a subject matter, and/or can guide and assist, individually or socially, to find or discover credible and value significant knowledge at much faster rate than the current traditional method of using search engine directories, social networking, blogging, and bookmarking websites. The methods, systems and services of the presented disclosure can significantly increase productivity of knowledge-based users and quality of their work.

94 Claims, 16 Drawing Sheets

(56) References Cited

U.S. PATENT DOCUMENTS

2010/0281025 A1* 11/2010 Tsatsou et al. ............... 707/733
2010/0293048 A1* 11/2010 Singolda et al. ........... 705/14.43
2011/0102539 A1* 5/2011 Ferren ........................ 348/14.08

OTHER PUBLICATIONS

U.S. Appl. No. 12/547,879, filed Mar. 4, 2010, Hamid Hatami-Hanza.

U.S. Appl. No. 12/939,112, filed May 12, 2011, Hamid Hatami-Hanza.

U.S. Appl. No. 12/908,856, filed Apr. 21, 2011, Hamid Hatami-Hanza.

U.S. Appl. No. 12/755,415, filed Nov. 18, 2010, Hamid Hatami-Hanza.

U.S. Appl. No. 12/946,838, filed May 26, 2011, Hamid Hatami-Hanza.

* cited by examiner

Sorted based on VSM of the partition:

- Statement ( e.g. sentence partitions) # 1

- Statement # 2

- ...

- Statement # i

FIG. 2a

-Graphical means to draw, define, and confine the desired subject matters in this map for which the knowledge is sought.

-The action cause the system to display statement/s having predetermined significance value/s that contain one or more of SM011, SM012 and SM0311

INTERACTIVE AND SOCIAL KNOWLEDGE DISCOVERY SESSIONS

PRIOR U.S. APPLICATION

This application claims priority from U.S. provisional patent application No. 61/311,368 filed on Mar. 7, 2010, entitled "Interactive and Social Knowledge Discovery Sessions" which is incorporated herein by reference.

CROSS-REFERENCES TO RELATED APPLICATIONS

This application also cross-references the U.S. patent application entitled 61/263,685 filed on Nov. 23, 2009, entitled: "Automatic Content Composition Generation", application Ser. No. 12/946,838, now U.S. Pat. No. 8,560,599 B2, filed on Nov. 15, 2010; and U.S. patent application entitled "System and Method For Value Significance Evaluation of Ontological Subjects of Networks and the Applications Thereof", application Ser. No. 12/939,112, now U.S. Pat. No. 8,401,980 B2, filed on Nov. 3, 2010; and U.S. patent application entitled "System And Method For A Unified Semantic Ranking Of Compositions Of Ontological Subjects And The Applications Thereof", application Ser. No. 12/755,415, now U.S. Pat. No. 8,612,445 B2, filed on Apr. 7, 2010; and U.S. patent application entitled "System and Method of Ontological Subject Mapping for knowledge Processing Applications", application Ser. No. 12/547,879, now U.S. Pat. No. 8,452,725 B2, filed on Aug. 26, 2009; and

FIELD OF INVENTION

This invention generally relates to interactive and social knowledge discovery and representation, information processing, ontological subject processing, knowledge processing and discovery, knowledge retrieval, artificial intelligence, information theory, natural language processing and the applications.

BACKGROUND OF THE INVENTION

Currently a researcher or information seeker usually use a search engine to get a list of compositions that potentially can provide an answer or assist the researcher to get a better understanding of her/his subject matter of interest and help the user in his/her challenge. As widely been experienced this exercise is not very efficient and take a lot of time and requires lots of skills for a researcher. The users still have to sift through countless pages to find out the answer. Moreover rankings of webpages can be manipulated by ordinary skilled search engine optimizers. Users still have to use search engines anyway since they do not have better instrument yet.

Therefore current search engine services are not sufficiently efficient for knowledge discoveries, and even sometimes are misleading for knowledge seekers and professional researchers as well as general public.

SUMMARY OF THE INVENTION

One object of this invention is to find out and address the drawbacks with the current stages of information retrieval and knowledge acquisition/discovery and the overlooked potentials of the search engine and social networking services. The invention consequently will disclose methods and systems without those shortcomings.

The invention moreover discloses systems and methods of interactive and social knowledge discovery and new services.

Consider an ordinary searcher or a professional knowledge worker who need or is assigned to gain information or to obtain knowledge about a subject matter. However, for any topic or subject matter, there are vast amount of repositories such as collection of research papers, news feeds, interviews, talks, lectures, books, advertisements, twitters short messages, multimedia content, videos and the like. One needs lots of expertise, time, and many years of training to benefit from such unstructured collections of information in order to find out the knowledge that he is looking for or make a contribution to advance the state of the knowledge.

Also very often a user is only looking for a quick fact or a verified piece of information about something, and because of that the user has to spend considerable amount of time to find the correct and useful information. Nevertheless, still the user cannot be sure that how credible and reliable the found information is. Sometimes on the other hand a user would like to find novel information about something that is less known or less quoted or is hidden inside a long website or several less observed webpages or compositions.

In order to speed up the process of such a research and due diligences it is important to identify the role of each concept, any force, and their relations in the desired system of knowledge. By the system of knowledge we mean a Body Of Knowledge (sometimes called BOK hereinafter) in any field, narrow or wide. For instance a system of knowledge or a BOK can be defined about an individual or an enterprise entity or any scientific subject matter. In these exemplary cases, there are many unknowns that are desired to be known. So consider someone has collected many or all textual compositions about a subject. Apparently the collection contains many useful pieces of information about the subject that are important but can easily be overlooked by a human due to the limitations of processing capability and memory capacity of the individual's brain.

In this invention we introduce a system, method and services that assist the information seeker/s interactively. The system provides a straight answer to the client question, or queries according to the latest stage of knowledge in the form of various types of services that the client may demand.

For example, in one exemplary embodiment, the user only provide a keyword and asking about the most credible fact or statement related to the keyword or the query and the system and method of the present invention will start an interactive searching or knowledge discovery session. The system will assemble a body of knowledge, using either its own databases or other search engines or any other means, related to the user's query or subject matter. Using the method of the referenced patent applications the system partitions and evaluates the significance of each partitions of the BOK by calculating the value significance measures (VSMx, x=1, 2 ... ) of the partitions of the BOK. The partitions of the BOK can be simply the words and phrases, sentences, paragraphs, pages, and whole document or a webpage. Having calculated the VSMs of the partitions then the system can provide the appropriate answer or response to the request for knowledge back to the user. Usually the answer contains those partitions, e.g. sentences or paragraphs, of the BOK that have scored the highest VSMs and contains the requested subject matter/s or other associates of the subject matter found in BOK. However, the answer also could be the webpages or the whole document that have scored high. If the user asking for novel information or knowledge about a subject matter, that can also be found in the BOK, the interactive knowledge discovery session follows the methods of the patent application Ser. No. 12/939,112 and select the appropriate type of VSM for scoring the partitions for that service and return or provide the response accordingly.

In another instance and according to one exemplary embodiment of this invention the system therefore will provide an overall credible summary according to the state of the knowledge about the query or the subject matter in the context of the BOK, using the content of the BOK, and get back to the user.

In yet another exemplary embodiment, the session provides a concise summary in the form of bulleted presentation which makes it easier to grasp the context and the most important knowable parts about the subject matter. Each of the bulleted statement states one of the most credible facts about an important aspect of the subject matter. Moreover the presentation can have the option and capability for being pointed by the searcher and get more comprehensive credible information about the statement. By credible here we mean the most valuable partitions of the contents of the BOK as were defined and can be calculated using the teachings of the reference patent application Ser. Nos. 12/755,415 and 12/939,112.

In another instance consider that the BOK consists of a plurality of news feed, which are usually very redundant, then the system and method introduced in this invention provide the user with the most important and credible pieces of the news while the user or the client can be sure that he/she has found knowledge of the most important parts of the news without worrying about missing the most important information contained in the news.

In another exemplary embodiment, the system provides graphs that can be used as cognitive maps to visually and quickly grasp the context of subject matter's BOK. In fact, the system will provide a backbone graph indicating the relationships between the concepts and entities of the BOK and therefore visualizes the true context of the BOK and therefore the context of the universe of the body of knowledge is revealed. A graphical user interface GUI) is further devised that a user can use by pointing on a node/s and/or edge/s of the knowledge map in order to get the most credible content found in the body of knowledge related to that node or the nodes connected by the pointed edge. In this way the user can quickly navigates the most important knowable about the subject matter and help the user to reason further and to reach his/her own conclusions about other aspects of the subject matter.

Further, the user then will be provided with environments to ask further and/or more specific question and the system adaptively and interactively provides the answer found from the assembled body of knowledge in relation to the user's subject matter of interest. The user again can ask more specific questions and the system will provide more further detailed information in response to the latest user's question or request. The system effectively will act as an expert knowledge consultant to the user interactively. The system moreover keeps track of the exploration and provides the trajectory with the highest valued partitions of the information in each stage of the exploration trajectory. In this way the searcher and the system participate and collaborate to narrow down the relations and/or find the best research path or finding/discovering the logical relations between the ontological subjects (e.g. subject matters) of the interest contained and used n the BOK.

Among the many advantages of the presented system and method of the knowledge discovery is that even a less known website that have one extremely valuable piece of information will be seen in the searching session. Therefore if a webpage has even one wining partitions it will make it to the top results and will have better chance of being seen and noticed. The system is therefore fairer giving the user the best exposure to valuable contents while it also give the service provider vendor the capability of soliciting more target advertiser if desired by the service provider.

In another embodiment, additionally the system and the client discover new relations between ontological subjects (OSs) that were not known or were less known and the user can add or edit this new information to the system with human edition. Since the interactive searching and exploration session is challenging and fun therefore many people can participate simultaneously or non-simultaneously. There could further be a prize to find out or guess or reasoning a new knowledge so that people will be more motivated to use the system and as a result add new or more polished knowledge.

Also more importantly, it is noticed here that at any given time a large number of people are searching and exploring for the same subject matters by querying and connecting to search engines. If the unknown to each other users, could communicate, through an automatic mediator, with each other while exploring and searching for knowledge about a subject, then this new scheme of knowledge exploration, discovery, and knowledge distillations will find a faster pace and more problems can be solved in less time leading to economical as well as cultural and personal growth of the society and human being as a whole.

Accordingly, another embodiment is given in this invention wherein the interactive searching and exploration session or question answering, can be taken simultaneously with other clients that are searching or looking for the knowledge about a common subject matter. In this way we have an interactive and social assisted knowledge discovery session to proliferate further knowledge discoveries. The questions from user and the answers given by the system can be exchanged in the multimedia forms. For instance the client can ask a question by text or audio and receive the answer in the form of a text or audio or other multimedia forms.

Therefore, in yet another embodiment according to the methods of evaluating the value of compositions as described and disclosed in the patent application Ser. Nos. 12/755,415 and 12/939,112, there is provided an interactive searching service that once a user quires the systems about a subject matter the user or the client is guided to an open session that is shared with other users or clients that were looking for knowledge about the same subject matter, and the new user can quickly get an update on the latest findings and the best pieces of information or knowledge found in the respective BOK of the subject matter. The new participant therefore can also join the interactive and social knowledge discovery session and start to gain instant updated knowledge or contribute to the BOK of that session. However since the system is capable of interacting with the user the system itself can be viewed as an active participant and therefore the social interactive knowledge discovery session can always be formed even if there is only one human participant. Although some of the participants might be software agents that are looking to find the information for their own clients.

In the case of social exploration the system can always provide the most updated and well rounded answer to the participants. The system further aggregate the participants contributions and distill the contributions and show the stage of knowledge about the subject matter of the session and its associates subjects matters up to the second and also show the exploring and discovery trajectory taken in that session. The session can be closed or stayed open indefinitely either by the system or by the client/user.

In the social exploration session the system can also give an instant feedback to the participants and bring the latest most valuable related information to the participant contribution or statement or question. Also a good question can be rewarded based on the value and the generated knowledge as a result of the question or the proposed statement by measuring the significance value of the generated knowledge as a result of the user's question or proposal.

The number of participants can be very large and the system provides the latest founding about the subject matter of the interest to each participant. In this case the system will act as a mediator. The participants can be the registered users competing with each other to provide a higher value contribution thereby giving the people the incentive and motivation to participate. The system can provide the incentive to the contributing participant in the form of credit or monetary valuable scores, notes, etc.

Third party can provide further incentives for knowledge discovery sessions. For instance an enterprise can introduce a prize or incentive to the contributors of knowledge discovery sessions related to the subject matters that are important for that enterprise. The system is able to measure the significance of contributions again using the technology and system and method disclosed the referenced patent applications.

In another application consider that a user have collected a number of documents and contents and would like to search within that collection or body of knowledge (BOK). The current keyword searching methods alone will not work here since the collection might be large and for any given keyword, especially for the dominant keywords of the BOK, there will be found many statements or partitions that contain the keyword but might not have any real knowledge significance or informational value. The presented system and method here along with the methods and teachings of the referenced patent applications always presents the most significant partitions of the BOK in response to a query from user for finding the information from the BOK. Again the system moreover will provide a backbone graph indicating the relationships between the concepts and entities of the BOK and therefore visualizes the true context of the BOK and therefore the context of the universe of the body of knowledge is revealed.

One application of such embodiments beside individual users, as an individual researcher or knowledge seeker or student or trainee, is that large number of people can participate to produce new knowledge or compose a new and more valuable composition. For instance editorial articles can be added to the knowledge database. The content further can be shared or published in one of the publishing shops (as was introduced in the published US patent application US 200930030897 filed by the same applicant) or other media.

Therefore in yet another embodiment a user can create his own journal and submit and solicit contents, the system then assemble a BOK (with or without the help of the user or other users) for that subject matter submitted by the user. There could be many sorts of arrangements between the vendor executing the methods of this invention and a user for establishing a journal. For instance, if the user's content rank in top ten list of the most valuable contents in the context of the assembled BOK then user have the option to claim that journal (in accordance with the published patent application US 2009/0030897 disclosures) and enjoys the benefits of the journal such as ad revenue, paid research etc. However still other people can compete to generate other journals on the same subject matter if they become qualifies (their submitted content ranks top ten in the context of the assembled BOK related to the subject matter)

However, in yet another embodiment, a client and user start a session for automatic and interactive content multimedia generation. The content could be also be a multimedia content (as explained in the provisional patent application 61/253, 5114 filed on Oct. 21, 2009 and the provisional patent application 61/263,685 filed on Nov. 23, 2009) and interactively edit the user's generated multimedia content until he/she is satisfied and perhaps would like to share the content with others in the publishing or broadcasting shops or YouTube and/or the like.

Consequently, the disclosed system/s and method/s can assist a knowledge user/contributor to obtain a straight answer to his/her request for knowledge about one or more subject matter, can mediates a large group of unknown inquirers and present them with distilled stage of knowledge related to a subject matter, and/or can guide and assist, individually or socially, to find or discover credible value significant knowledge at much faster rate than the current traditional method of using search engine directories, social networking, blogging, and bookmarking websites. Such a system and method will increase significantly the productivity and quality of the works of knowledge-based works as well as general public.

BRIEF DESCRIPTION OF THE FIGURES

FIG. 2a: shows one exemplary result of the IKDS in response to the user/s request for information in which the knowledge about a subject matter is represented in the form of shortest most credible statements found in the assembled Body Of Knowledge (BOK).

FIG. 3a in the form of tree and 3b is the free form graph or map with the queried subject matter SM0 in the middle.

DETAILED DESCRIPTION

Figure 1:
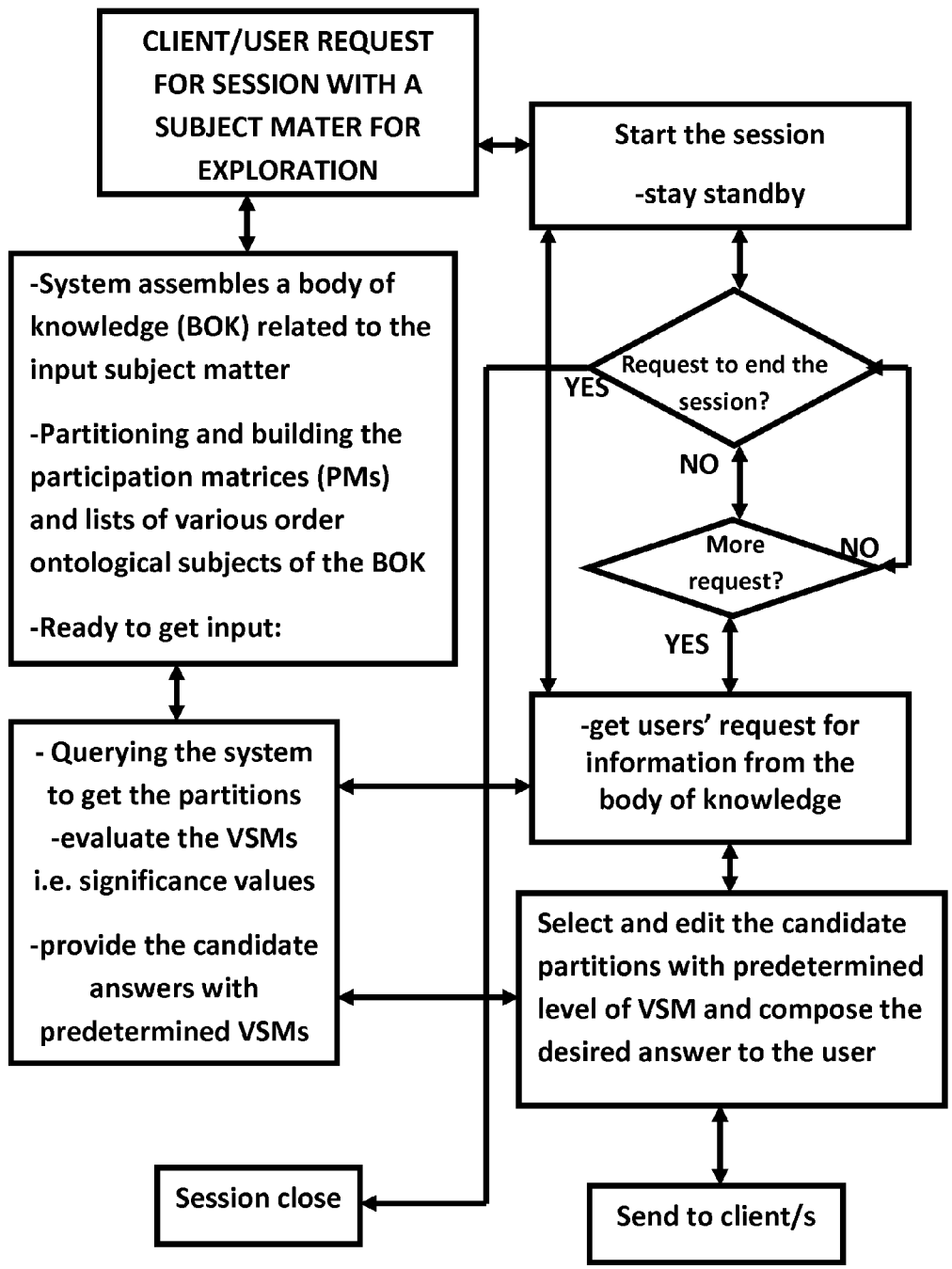
FIG. 1: shows one exemplary flow diagram illustration of the Interactive Knowledge Discovery Session (IKDS) system.

Currently search engines do not provide further services besides pointing out to webpages and displaying a partition of the pages that a keyword has been appeared without any judgment on the importance of that partition. The default in current searching utilities is that if a webpage has high rank then the displayed partition should also have high quality. Moreover the need for more information will immediately arise after first finding of the desired knowledge. Many personal experiences with search engine show that they are not helpful in assisting knowledge seeker to find the right information in many occasions. In other words search engines do not present the correct and sought after information to the searcher but rather only points them to some potential (almost random looking order) places that one might find the answer that is looking for.

The problem might be due to the fact that there are so many websites and documents having good contents that the current searching engine algorithms and services are not able to effectively find the best and the most relevant information that one needs. This is more evident when someone is searching for information or knowledge about subjects that potentially hundred of thousands or even millions of documents are found by the search engine service providers.

Besides, even though the size of the Internet's content has grown tremendously during the last decade, the look and technology of search engines have remained effectively the same. Search engine services provide 'one size fits all' response to people's queries by just showing the users a reputable website that has mentioned the subject matter (i.e. the user query or part of it) which is even very often hard to find the highlighted part in the pointed website or webpage as well. The partitions that are presented along with the ranked search result only contain the keywords of the query at the best and there is no guarantee that these partitions are useful or have an intrinsic value or can help the user.

Furthermore, the current state of the art for a knowledge seeker and a content composer is not fair and only works in favor of the branded websites and webpages, which is both not healthy for knowledge discovery nor it is fair to individual knowledge contributors who do not have access to the branded webpages for visibly publishing their work among many similar compositions. That is because so far search engines do not effectively assess the value of compositions independent of the publisher reputation and popularity. Branded web-publisher can have many compositions for a single subject matter which makes it hard to find a content or a part that can have really significant intrinsic value.

Also more importantly, one can notice that at any given time a large number of people are searching and exploring for the same subject matters by querying and connecting to search engines. The current systems and methods of search engines do not have the capability to capitalize on this opportunity to simultaneously connect these diverse groups of people commonly looking for specific knowledge. Social networking websites, blogger, bookmarking services and the like, while connecting people and friends, do not provide the desired service since people are instructed to loggings and only have access to a selected group of people and discussions. This decreases the chances of meeting likeminded people if they did not know each other before. Moreover, the social networking websites and services are not geared toward finding, distilling, and acquiring knowledge since they do not have automatic mediating tools to present the distilled stage of knowledge about a subject matter to its users and visitors.

If the users, unknown to each other, could communicate, through an automatic mediator, with each other while exploring and searching for knowledge about a subject, then this new scheme of knowledge exploration, discovery, and knowledge distillations will find a faster pace and more problems can be solved in less time leading to economical as well cultural and personal growth of the society and human being as a whole.

Therefore, a system and/or method is desirable to present the pieces of information and knowledge, based on their intrinsic significance or values in the context of a large body of knowledge, which is less dependable on the popularity, brand and reputation of the publisher. Moreover it is very desirable to have a system and/or method that could provide the correct and verified information on demand and have the capability to accompany and assist the users toward finding or creating the credible answer and contents in his/her knowledge exploration journey. Also importantly, it is very desirable to have a system and method of knowledge exchange and discovery session for users who are seeking and exploring common subject matter/s.

Consequently, there is a need for more advanced system/s and method/s that can assist a knowledge user/contributor to obtain a straight answer to his/her request for knowledge about one or more subject matter, can mediates a large group of unknown inquirers and present them with distilled stage of knowledge related to a subject matter, and/or can guide and assist, individually or socially, to find or discover credible value significant knowledge at much faster rate than the current traditional method of using search engine directories, social networking, blogging, and bookmarking websites. Such a system and method, which is disclosed herein, will increase significantly the productivity and quality of the works of knowledge-based works as well as general public.

The present detailed disclosure uses mostly the notions, definitions, variables, and the disclosed methods and algorithms from the patent application Ser. No. 12/755,415 entitled "System and Method For A Unified Semantic Ranking of Compositions of Ontological Subjects and the Applications Thereof" filed on Apr. 7, 2010 and the patent application Ser. No. 12/939,112 entitled "System and Method of Value Significance Evaluation of Ontological Subjects of Networks and the Applications Thereof" filed on Nov. 3, 2010 by the same applicant.

In the patent application Ser. Nos. 12/755,415 and 12/939,112 methods, systems, and algorithms were disclosed to evaluate the significance value of ontological subjects and compositions of ontological subjects such as measuring the value significance of words, sentences, paragraphs, documents, or webpages in the context of a "Body of Knowledge" as we sometimes call hereafter as BOK.

Accordingly, this disclosure uses the definitions that were introduced in the referenced applications and more particularly in the U.S. patent application Ser. Nos. 12/755,415 and 12/939,112 which are incorporated as references. We also use some or all parts of the definitions and the methods and algorithms of those applications in performing the disclosed systems and methods of "Interactive and Social Knowledge Discovery Sessions ISKDS" services. Accordingly some introductory parts of those applications are recited here again along with more clarifying points according to their usage in this disclosure and the mathematical formulations herein.

I—DEFINITIONS

1. Ontological Subject: symbol or signal referring to a thing (tangible or otherwise) worthy of knowing about. Therefore Ontological Subject means generally any string of characters, but more specifically, characters, letters, numbers, words, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological Subject's and the abbreviation OS or OSs are used interchangeably.

2. Ordered Ontological subjects: Ontological Subjects can be divided into sets with different orders depends on their length, attribute, and function. For instance, for ontological subjects of textual nature, one may characterizes letters as zeroth order OS, words as the first order, sentences as the second order, paragraphs as the third order, pages or chapters as the fourth order, documents as the fifth order, corpuses as the sixth order OS and so on. So a higher order OS is a combination or a set of lower order OSs or lower order OSs are members of a higher order OS. Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a video signal, bits (electrical One and Zero) can be defined as zeroth order OS, the bytes as first order, any sets of bytes as third order, and sets of sets of bytes, e.g. a frame, as fourth order OS and so on. Therefore definitions of orders for ontological subjects are arbitrary set of initial definitions that one should stick to in order to make sense of methods and mathematical formulations presented here and being able to interpret the consequent results or outcomes in more sensible and familiar language.

More importantly Ontological Subjects can be stored, processed, manipulated, and transported only by transferring, transforming, and using matter or energy (equivalent to matter) and hence the OS processing is a completely physical transformation of materials and energy.

3. Composition: is an OS composed of constituent ontological subjects of lower or the same order, particularly text documents written in natural language documents, genetic codes, encryption codes, data files, voice files, video files, and any mixture thereof. A collection, or a set, of compositions is also a composition. Therefore a composition is also an Ontological Subject which can be broken to lower order constituent Ontological Subjects. In this disclosure, the preferred exemplary composition is a set of data containing ontological subjects, for example a webpage, papers, documents, books, a set of webpages, sets of PDF articles, multimedia files, or simply words and phrases. Compositions are distinctly defined here for assisting the description in more familiar language than a technical language using only the defined OSs notations.

4. Partitions of a composition: a partition of a composition, in general, is a part or whole, i.e. a subset, of a composition or collection of compositions. Therefore, a partition is also an Ontological Subject having the same or lower order than the composition as an OS. More specifically in the case of textual compositions, partitions of a composition can be chosen to be characters, words, sentences, paragraphs, chapters, webpage, etc. A partition of a composition is also any string of symbols representing any form of information bearing signals such as audio or videos, texts, DNA molecules, genetic letters, genes, and any combinations thereof. However our preferred exemplary definition of a partition of a composition in this disclosure is word, sentence, paragraph, page, chapters and the like, or WebPages, and partitions of a collection of compositions can moreover include one or more of the individual compositions. Partitions are also distinctly defined here for assisting the description in more familiar language than a technical language using only the general OSs definitions.

5. Value Significance Measure: assigning a quantity, or a number or feature or a metric for an OS from a set of OSs so as to assist the selection of one or more of the OSs from the set. More conveniently and in most cases the significance measure is a type of numerical quantity assigned to a partition of a composition. Therefore significance measures are functions of OSs and one or more of other related mathematical objects, wherein a mathematical object can, for instance, be a mathematical object containing information of participations of OSs in each other, whose values are used in the decisions about the constituent OSs of a composition.

6. Summarization: is a process of selecting one or more OS from one or more sets of OSs according to predetermined criteria with or without the help of value significance and ranking metric/s. The selection or filtering of one or more OS from a set of OSs is usually done for the purposes of representation of a body of data by a summary as an indicative of that body. Specifically, therefore, in this disclosure searching through a set of partitions or compositions, and showing the search results according to the predetermined criteria is considered a form of summarization. In this view finding an answer to a query, e.g. question answering, or finding a composition related or similar to an input composition etc. are also a form of searching through a set of partitions and therefore are a form of summarization according to the given definitions here.

7. Subject matter: generally is an ontological subject or a composition itself. Therefore subject matters and OSs have in principal the same characteristics and are not distinguishable from each other. Yet less generally and bit more specifically a subject matter (SM), in the preferred exemplary embodiments of this application, is a word or combination of a word that shows a repeated pattern in many documents and people or some groups of people come to recognize that word or combinatory phrase. Nouns and noun phrases, verbs and verb phrases, with or without adjectives, are examples of subject matters. For instance the word "writing" could be a subject matter, and the phrase "Good Writing" is also a subject matter. A subject matter can also be a sentence or any combination of number of sentences. They are mostly related, but not limited, to nouns, noun phrases, entities, and things, real or imaginary. But preferably almost most of the time is a keyword or set of keywords or topic or a title of interest.

8. Body of Knowledge: is a composition or set of compositions available or assembled from different sources. The body of knowledge can be related to one or more subject matter or just a free or random collection of compositions. The "Body of Knowledge" may be abbreviated from time to time as BOK in this application. The BOK can further include compositions of different forms for instance one part of an exemplary BOK can be a text and another part contains video, or picture, or a genetic code.

9. The usage of quotation marks " ": throughout the disclosure several compound names of variable, functions and mathematical objects (such as "participation matrix", "conditional occurrence probability" and the like) will be introduced that once or more is being placed between the quotation marks (" ") for identifying them as one object and must not be interpreted as being a direct quote from the literatures outside this disclosure (except the incorporated referenced patent applications). Furthermore the term "module" in this application means any part, section and/or piece/s of codes of a computer executable instruction program. Additionally the term "computer-readable storage medium" refers to all types of non-transitory computer readable media such as magnetic cassettes, flash memory cards, digital video discs, random access memories (RAMs), Bernoulli cartridges, read only memories (ROMs) and the like, with the sole exception being a transitory, propagating signal."

Now the invention is disclosed in details in reference to the accompanying figures and exemplary cases and embodiments in the following sub sections.

II-I PARTICIPATION MATRIX BUILDING FOR A COMPOSITION

Assuming we have an input composition of ontological subjects, e.g. an input text, the Participation Matrix (PM) is a matrix indicating the participation of each ontological subject in each partitions of the composition. In other words in terms of our definitions, PM indicate the participation of one or more lower order OS into one or more OS of higher or the same order. PM is the most important array of data in this disclosure containing the raw information from which many other important functions, information, features, and desirable parameters can be extracted. Without intending any limitation on the value of PM entries, in the preferred embodiments throughout most of this disclosure (unless stated otherwise) the PM is a binary matrix having entries of one or zero and is built for a composition or a set of compositions as the following:

1. break the composition to a desired number of partitions. For example, for a text document we can break the documents into chapters, pages, paragraphs, lines, and/or sentences, words etc.,
2. identify the desired form, number, and order of the ontological subject of the composition by appropriate method such as parsing a text documents into its constituent words and phrases, sentences, etc.,
3. select a desired N number of OSs of order k and a desired M number of OSs of order l (these OSs are usually the partitions of the composition from the step 1) existing in the composition, according to certain predetermined criteria, and;
4. construct a N×M matrix in which the ith raw ($R_i$) is a vector, with dimension M, indicating the presence of the ith OS of order k, (often extracted from the composition under investigation), in the OSs of order l, (often extracted from the same or another composition under investigation), by having a nonzero value, and not present by having the value of zero. In the exemplary embodiments of this disclosure usually the nonzero value is one (i.e. making the vector $R_i$ a binary) for ease of explanation. However all the formulations and calculations can still be followed by those skilled in the art by placing any other desired nonzero value to show the presence of OSs of order k in the OSs of order l."
5.

We call this binary matrix the Participation Matrix of the order kl ($PM^{kl}$) which can be shown as:

$$PM^{kl} = \begin{matrix} & OS_1^l & \cdots & OS_M^l \\ OS_1^k & \begin{pmatrix} pm_{11}^{kl} & \cdots & pm_{1M}^{kl} \\ \vdots & \ddots & \vdots \\ OS_N^k & pm_{N1}^{kl} & \cdots & pm_{NM}^{kl} \end{pmatrix} \end{matrix} \quad (1)$$

where $OS_i^l$ is the ith OS of the lth order, $OS_i^k$ is the ith OS of the kth order, extracted from the composition, and $PM_{ij}^{kl}=1$ if $OS_i^k$ have participated, i.e. is a member, in the $OS_j^l$ and 0 otherwise.

The participating matrix of order lk, i.e. $PM^{lk}$, can also be defined which is simply the transpose of $PM^{kl}$ whose elements are given by:

$$PM_{ij}^{lk} = PM_{ji}^{kl} \quad (2).$$

Accordingly without limiting the scope of invention, the description is given by exemplary embodiments using only the general participation matrix of the order kl, i.e the $PM^{kl}$.

One of the advantage and benefit of transforming the information of a composition into participation matrices is that once we attribute something to one of the OSs then we can evaluate the measures of that attributes for the other order OSs using the PMs.

In the patent application Ser. No. 12/939,112 we defined the association strength of each two OSs as a function of their co-occurrence in the composition, or the partitions of the composition, and the probability of occurrences of each one of the OSs.

II-II—VALUE EVALUATION OF THE ONTOLOGICAL SUBJECTS

After having constructed the $PM^{kl}$ the applicant now launch to explain the methods of evaluating the "value significances" of the ontological subjects of the compositions. One of the advantages and benefits of transforming the information of a composition into participation matrices is that once we attribute something to one of the OSs then we can evaluate the merit of the other OSs in regards to that attribute with different orders using the PMs. For instance, if we find words of particular importance in a composition then we can readily find the most important sentences of the composition wherein the most important sentences contain the most important words in regards to that particular importance.

We explain the method and the algorithm with the step by step formulations that is easy to implement by those of ordinary skilled in the art and by employing computer programming languages and computer hardware systems that can be optimized to perform the algorithm efficiently and produce useful outputs for various desired applications.

Here we first concentrate on value significance evolution of a predetermined order OSs by several exemplary embodiments of the preferred methods to evaluate the value of an OS of the predetermined order within a same order set of OSs of the composition.

Referring to the FIG. 1 of the incorporated reference, the patent application Ser. No. 12/939,112 now U.S. Pat. No. 8,401,980 B2, here, we start with one definition for association of two or more OSs of a composition to each other and show how to evaluate the strength of the association between each two OSs of composition. In FIG. 1 the "association strength" of each two OSs has been defined as a function of their co-occurrence in the composition or the partitions of the composition, and the probability of occurrences of each one of them.

FIG. 1 of the incorporated reference, the patent application Ser. No. 12/939,112 now U.S. Pat. No. 8,401,980 B2, shows the concept and rational of this definition for association strength according to this disclosure. The larger and thicker elliptical shapes are indicative of the probability of occurrences of $OS_i^k$ and $OS_j^k$ in the composition that were driven from the data of $PM^{kl}$ and wherein the small circles inside the area is representing the $OS^l$ s of the composition. The overlap area shows the common $OS^l$ between the $OS_i^k$ and $OS_j^k$ in which the have co-occurred, i.e. those partitions of the composition that includes both $OS_i^k$ and $OS_j^k$. The co-occurrence number is shown by $com_{ij}^{k|l}$ which is an element of the "Co-Occurrence Matrix (COM)" (as will be introduced later) and essentially showing that how many times $OS_i^k$ and $OS_j^k$ has participated jointly into the OSs of the order l of the composition.

From $PM^{kl}$ one can easily arrive at the CO-Occurrence Matrix $COM^{k|l}$ for OSs of the same order as follow:

$$COM^{k|l} = PM^{kl} * (PM^{kl})' \quad \text{R1-(3)},$$

where the "'" and "*" show the matrix transposition and multiplication operation respectively. The COM is a N×N square matrix. This is the co-occurrences of the ontological subjects of order k in the partitions (ontological subjects of order l) within the composition and is one indication of the association of OSs of order k obtained from their pattern of participations in the OSs of order l of the composition.

Having calculated the $COM^{k|l}$ we define the association strength between $OS_j^k$ and $OS_i^k$ as shown in FIG. 1 of the incorporated reference, the patent application Ser. No. 12/755,415 now U.S. Pat. No. 8,612,445. The association strengths play an important role in the value significance evaluation of OSs of the compositions and, in fact, can be shown as entries of a new matrix called here the "Association Strength Matrix ($ASM^{k|l}$)" whose entries will be defined to show the concept and rational of association strength according to one exemplary embodiment of the invention as the following:

$$asm_{ji}^{k|l} = c \frac{com_{ij}^{k|l}}{(iop_j^{k|l} / iop_i^{k|l})} = c \frac{com_{ij}^{k|l} \cdot iop_i^{k|l}}{iop_j^{k|l}}, \, i,j = 1 \ldots N, \quad \text{R1-(4)}$$

where c is a predetermined constant or a predefined function of other variables in Eq. R1-4, $com_{ij}^{k|l}$ are the individual entries of the $COM^{k|l}$ showing the co-occurrence of the $OS_i^k$ and $OS_j^k$ in the partitions, and the $iop_i^{k|l}$ and $iop_j^{k|l}$ are the "independent occurrence probability" of $OS_i^k$ and $OS_j^k$ in the partitions respectively, wherein the occurrence is happening in the partitions that are OSs of order l. However in this exemplary case we conveniently considered the case where c=1 as shown in FIG. 1 of the incorporated reference, the patent application Ser. No. 12/755,415 now U.S. Pat. No. 8,612,445. The probability of independent occurrence in a partition is the "Frequency of Occurrences", i.e. the number of times an $OS^k$ has been appeared in the composition or its partitions, divided by the total possible number of occurrences of that OS, i.e. the number of partitions when we do not consider repeated occurrences of an $OS^k$ in any partitions which is the case in this exemplary description.

The frequency of occurrences can be obtained by counting the occurrences of OSs of the particular order, e.g. counting the appearances of particular word in the text or counting its total occurrences in the partitions, or more conveniently be obtained from the $COM^{k|l}$. The "Frequency of Occurrences" of $OS_i^k$ is called here $FO_i^{k|l}$ and can be given by:

$$FO_i^{k|l} = com_{ii}^{k|l}. \quad \text{R1-(5)}$$

which is basically the elements on the main diagonal of the $COM^{k|l}$. The "Independent Occurrence Probability" (IOP) in the partitions (used in Eq. R1-4), therefore, can be given by:

$$iop_i^{k|l} = \frac{FO_i^{k|l}}{M}, \, i = 1 \ldots N. \quad \text{R1-(6)}$$

Introducing quantities from Eq. R1-5, and 6 into Eq. R1-, 4 the association strength therefore can be calculated. In a particular case, it can be seen that in Eq. R1-4, the association strength measure of each OS with itself is proportional to its frequency of occurrence. That is Eq. R1-4 results in $asm_{ii}^{k|l} = c \cdot FO_i^{k|l}$. However, in order to have a normalized value for $asm_{ii}^{k|l}$, i.e. $asm_{ii}^{k|l} = 1$, then one can use the case where $c = 1/FO_i^{k|l}$ in the Eq. R1-4 to have self association strength of normalized to 1. Nevertheless, when c=1 in Eq. R1-4 the results of the association strength calculations become much more pronounced and distinguishable making it suitable to find the true but less obvious associations of an OS. Furthermore, more parameters can be introduced in front of each of the variables in the equations above to have general enough formulations. However those parameters or more variables have been avoided here to prevent un-necessary complication of the formulations.

It is important to notice that the association strength defined by Eq. R1-4, is not asymmetric and generally $asm_{ji}^{k|l} \neq sm_{ij}^{k|l}$. One important aspect of the Eq. R1-4 is that in this invention it has been pointed out that associations of OSs of the compositions that have co-occurred in the partitions are not necessarily symmetric and in fact it is noticed in the invention that asymmetric association strength is more rational and better reflects the actual semantic relationship situations of OSs of the composition.

To illustrate further in this matter, Eq. R1-4 basically says that if a less popular OS co-occurred with a highly popular OS then the association of less poplar OS to highly popular OS is much stronger than the association of a highly popular OS having the same co-occurrences with the less popular OS. That make sense, since the popular OSs obviously have many associations and are less strongly bounded to anyone of them so by observing a high popular OSs one cannot gain much upfront information about the occurrence of less popular OSs. However observing occurrence of a less popular OSs having strong association to a popular OS can tip the information about the occurrence of the popular OS in the same partition, e.g. a sentence, of the composition.

A very important, useful, and quick use of Eq. R1-4 is to find the real associates of a word, e.g. a concept or an entity, from their pattern of usage in the partitions of textual compositions. Knowing the associates of words, e.g. finding out the associated entities to a particular entity of interest has many applications in the knowledge discovery and information retrieval. In particular, one application is to quickly get a glance at the context of that concept or entity or the whole composition under investigation.

In accordance to another aspect of the invention, one can recall from graph theories that each matrix can be regarded as an adjacency matrix of a graph or a network. Consequently, FIG. 2 of the incorporated reference, the patent application Ser. No. 12/755,415 now U.S. Pat. No. 8,612,445, shows a graph or a network of OSs of the composition whose adjacency matrix is the Association Strength Matrix (ASM). As seen the graph corresponding to the ASM can be shown as a directed and asymmetric graph or network of OSs. Therefore having the ASM one can represent the information of the ASM graphically. On the other hand by having a graph one can transform the information of the graph into an ASM type matrix and use the method and algorithm of this application to evaluate various value significance measures for the nodes of the graph or network. Various other graphs can be depicted and generated for each of the different matrixes introduced herein. FIG. 2 further demonstrate that how any composition of ontological subjects can be transformed (using the disclosed methods and algorithms) to a graph or network similar to the one shown in FIG. 2 showing the strength of the bounding between the nodes of the graph.

Using the association strength concept one can also quickly find out about the context of the compositions or visualize the context by making the corresponding graphs of associations as shown in FIG. 2 of the incorporated reference, the patent application Ser. No. 12/939,112 now U.S. Pat. No. 8,401,980 B2, here. Furthermore, the association strengths become instrumental for identifying the real associates of any OS within the composition. Once the composition is large or consist of very many documents one can identify the real associations of any ontological subject of the universe. Such a real association is useful when one wants to research about a subject so that she/he can be guided through the associations to gain more prospects and knowledge about a subject matter very efficiently. Therefore a user or a client can be efficiently guided in their research trajectory to gain substantial knowledge as fast as possible. For instance a search engine or a knowledge discovery system can provide its clients with the most relevant information once it has identified the real associations of the client's query, thereby increasing the relevancy of search results very considerably.

As another example, a service provider providing knowledge discovery assistance to its clients can look into the subjects having high associations strength with the subject matter of the client's interest, to give guidance as what other concepts, entities, objects etc. should she/he look into to have deeper understanding of a subject of interest or to collect further compositions and documents to extend the body of knowledge related to one or more subject matters of her/his/it's interest.

According to another aspect of the invention, we also put a value of significance on each OS based on the amount of information that they contribute to the composition and also by the amount of information that composition is giving about the OSs.

To evaluate the information contribution of each OS we use the information about the association strength as being related to the probability of co-occurrence of each two OSs in the partitions of the composition. The probability of occurrence $OS_i^k$ after knowing the occurrence of $OS_j^k$ in a partition, e.g. $OS^l$, is considered to be proportional to the association strength of $OS_j^k$ to $OS_i^k$, i.e. the $asm_{ji}^{k|l}$. Therefore we define yet another function named "Conditional Occurrence Probability $(COP^{k|l})$" here as being proportional to $asm_{ji}^{k|l}$. Hence to have entries of $COP^{k|l}$ as the following:

$$cop^{k|l}(i|j) = p^{k|l}(OS_i^k | OS_j^k) \propto asm_{ji}^{s|l} \qquad \text{R1-(7)}$$

Considering that $\Sigma_j iop_j^{k|l} \cdot cop^{k|l}(i|j) = iop_i^{k|l}$ (total conditional probabilities of occurrences of $OS_i^k$ in a partition is equal to independent occurrence probability of $OS_i^k$ in that partition) we arrive at:

$$cop^{k|l}(i|j) = \frac{iop_i^{k|l} \cdot asm_{ji}^{k|l}}{\Sigma_j iop_j^{k|l} \cdot asm_{ji}^{k|l}} \qquad \text{R1-(8)}$$

The matrix $cop^{k|l}(i|j)$ can be made to a row stochastic (assuming the i showing the index of rows) but spars (having many zero entries) and in terms of graph theories jargon it could be corresponded to an incomplete graph or network. However if for mathematical or computational reasons it becomes necessary, it can be made to become a matrix that corresponds to a complete graph (every node in the graph is connected directly to all other nodes) by subtracting an small amount from the non-zero elements and distribute it into the zero elements so that processing of the matrix for further purposes can be performed without mathematical difficulties (no division by zero etc.).

Now that we have defined and obtained preliminary mathematical objects of the invention, we proceed with defining several illustrating but important "value significance measures" (VSMs) and comparing them in terms of computational complexity and usefulness. Mathematically VSMs are vectors that correspond to a number of OSs of interest in the composition. Obviously the first indication of significance of an OS in the composition is the frequency of occurrence or number of times that an OS has been appeared in the composition or its partitions. The first Value Significance Measure of $OS_i^k$ which is called $VSM1_i^k$ then would be:

$$VSM1_i^{k|l} = FO_i^{k|l} \quad i=1\dots N \qquad \text{R1-(9)}$$

This is the simplest and most straightforward measure of significance of an OS in the composition. However when the composition or collection of compositions become large (contain very many OSs) the Frequency of Occurrences of many of OSs can become very close and therefore noisy making it not a very suitable measure of intrinsic significances. Specially as we will see in the next section when using this measure of significance to evaluate the value significance of higher order OSs, e.g. $VSM1_i^{l|k}$, the results could become noisy and less useful. That is because the frequency count or Frequency of Occurrence (FO) alone does not carry the information of the usage pattern and co-occurrence patterns of OSs with each other. However for many applications this measure of significance could be satisfactory considering the simplicity of the processing.

In accordance with another aspect of the invention, the second measure of significance is defined in terms of the "cumulative association strength" of each OS. This measure can carry the important information about the usage pattern and co-occurrence patterns of an OS with others. So the second value significance measure $VSM2_i^k$ for an $OS_i^k$ is defined versus the cumulative association strength that here is called "Association Significance Number $(ASN_i^k)$", will be:

$$VSM2_i^{k|l} = ASN_i^{k|l} = \Sigma_j asm_{ji}^{k|l} \; i,j=1\ldots N \qquad \text{R1-(10)}$$

The $VSM2_i^k$ is much less noisy than $VSM1_i^k$ and fairly simple to calculate. It must be noticed that $ASN_i^k$ is an indication of how strong other OSs are associated with $OS_i^k$ and not how strong $OS_i^k$ is associated with others. Alternatively it would be important to know a total quantity for association strength of an $OS_i^k$ to others which is $\Sigma_j asm_{ij}^{k|l}$ (the difference here with Eq. R1-10 is in the ij instead of ji in the summation). This quantity is also an important measure which shows overall association strength of $OS_i^k$ with others. The difference of $\Sigma_j asm_{ji}^{k|l} - \Sigma_j asm_{ij}^{k|l}$ is also an important indication of the significance of the $OS_i^k$ in the composition. The latter quantity or number shows the net amount of importance of and OS in terms of association strengths exchanges or forces. This quantity can be visualized by a three dimensional graph representing the quantity $\Sigma_j asm_{ji}^{k|l} - \Sigma_j asm_{ij}^{k|l}$. A positive number would indicate that other OSs are pushing the $OS_i^k$ up and negative will show that other OSs have to pull the $OS_i^k$ up in the three dimensional graph. Those skilled in the art can yet envision other measures of importance and parameters for investigation of importance of an OS in the composition using the concept of association strengths.

As an example of other measures of importance, and in accordance with another aspect of the invention and as yet another measure of value significance we notice that it would be helpful and important if one can know the amount of information that an OS is contributing to the composition and vice versa. To elaborate further on this value significance measure we notice that it is important if one can know that how much information the rest of the composition would have gained if an OS has occurred in the composition, and how much information would be lost when on OS is removed from the composition. Or saying it in another way, how much the composition is giving information about the particular OS and how much that particular OS add to the information of the composition. The concept of conditional entropy is proposed and is applicable here to be used for evaluation of such important value measure. Therefore, we can use the defined conditional occurrence probabilities (COP) to define and calculate "Conditional Entropy Measures (CEMs)" as another value significance measure.

Accordingly, yet a slightly more complicated but useful measure of significance could be sought based on the information contribution of each $OS_i^k$ or the conditional entropy of $OS_i^k$ given the rest of $OS^k$s of the composition are known. The third measure of value significance therefore is defined as:

$$VSM3_i^{k|l} = CEM1_i^{k|l} = H1_i^{k|l} = H_j(OS_i^k|OS_j^k) = -\Sigma_j iop_j^{k|l} \cdot cop^{k|l}(i|j) \log_2(cop^{k|l}(i|j)), \; i,j=1\ldots N \qquad \text{R1-(11)}$$

wherein $H_j$ stands for Shannon-defined type entropy that operates on j index only. In Eq. R1-11 any other basis for logarithm can also be used and $CEM1_i^{k|l}$ stands for first type "Conditional Entropy Measure" and $H1_i^{k|l}$ is to distinguish the first type entropy according to the formulations given here (as opposed to the second type entropy which is given shortly). This is the average conditional entropy of $OS_i^k$ over the M partitions given that $OS_j^{k|l}$ has also participated in the partition. That is every time $OS_i^k$ occurs in any partition we gain H bits of information.

And in accordance with yet another aspect of the invention another value significance measure is defined as:

$$VSM4_i^{k|l} = CEM2_i^{k|l} = H2_i^{k|l} = H_j(OS_j^k|OS_i^k) = -\Sigma_j cop^{k|l}(j|i) \log_2(cop^{k|l}(j|i)), \; i,j=1\ldots N \qquad \text{R1-(12)}$$

where $H_j$ stands for Shannon-defined type entropy that operates on j index only again, and wherein $CEM2_i^{k|l}$ stands for the second type "Conditional Entropy Measure" and $H2_i^{k|l}$ is to distinguish the second type entropy according to the formulations given here. That is the amount of information we gain any time an $OS^k$ other than $OS_i^k$ occurs in a partition knowing first that $OS_i^k$ has participated in the partition.

And in accordance with another aspect of the invention yet another important measure is defined by:

$$VSM5_i^{k|l} = DCEM_i^{k|l} = CEM1_i^{k|l} - CEM2_i^{k|l} = VSM3_i^{k|l} - VSM4_i^{k|l}, \; i=1\ldots N \qquad \text{R1-(13)}$$

where $DCEM_i^{k|l}$ stands for "Differential Conditional Entropy Measure" of $OS_i^k$. The $DCEM_i^{k|l}$ and is a vector having N element as is the case for other VSMs. The $VSM5^{k|l}$ is an important measure showing the net amount of entropy or information that each OS is contributing to or receiving from the composition. Though the total sum of $DCEM_i^{k|l}$ over the index i, is zero but a negative value of $VSM5_i^{k|l}$ (i.e. $DCEM_i^{k|l}$) is an indication that the composition is about those OSs with negative $VSM5^{k|l}$. The $VSM5^{k|l}$ is much less nosier than the other value significance measures but is in a very good agreement (but not exactly matched) with $VSM2^{k|l}$, i.e. the association significance number ($ASN^{k|l}$). This is important because calculating ASN is less process intensive yet yields a very good result in accordance with the all important $DCEM^{k|l}$.

Also important is that either of $CEM1^{k|l}$ or $CEM2^{k|l}$ can be also used (multiplying either one by $FO_i^{k|l}$) for measuring or evaluating the real information of the composition in terms of bits (wherein bit is a unit of information according to the Information Theory) which could be considered as yet another measure of value significance for the whole composition or the partitions therein. For instance, this measure can be used to evaluate the merits of a document among many other similar or any collection of documents. The information value of the OSs or the partitions (by addition the individual information of the its constituent OSs) is a very good and familiar measure of merit and therefore can be another good quantity as an indication of value significance.

Those skilled in the art can use the teachings, concepts, methods and formulations of value significance evaluation of ontological subjects and the partitions of the composition with various other alterations and for many applications. We now lunch into describing a number of exemplary embodiments of implementing the methods and the exemplary related systems of performing the methods and some exemplary applications in real life situations.

Referring to the FIG. 3 of the incorporated reference, the patent application Ser. No. 12/939,112 now U.S. Pat. No. 8,401,980 B2, here, it shows the block diagram of one basic algorithm of calculating a number of "Value Significance Measures" of the Ontological Subjects of an input composition according to the teachings of the invention. As seen the input composition is partitioned to a number of desirable partitions and the lower order OSs of partitions are also extracted and indexed in various lists of OSs of different orders. In the preferred embodiment of the method the partitions would be textual semantics units of different lengths such as paragraphs, or sentences and chapters. Again here we consider words and some special characters and symbols as OS order 1, the sentences as OS order 2, the paragraphs as order 3, the sections as OS order 4, and individual documents as OSs of order 5. The input composition can be a single man-made article, a number of documents, or a huge corpus etc. There is no limit on the length of the composition. In an extreme case the input composition might be the whole internet repositories.

Referring to the FIG. 3 of the incorporated reference, the patent application the patent application Ser. No. 12/939,112 now U.S. Pat. No. 8,401,980 B2, again, it further shows the steps in detail for performing the methods and the algorithms. After partitioning and extracting the OSs of desired orders, the participation matrix or matrices of desired dimensions and orders are built from which the co-occurrence matrix/s (COM) is built. The Frequency of Occurrence (FO) can be obtained by counting the OSs while extracting them from the composition or can be obtained from the Co-Occurrence Matrix as indicated in Eq. R1-5, and hence obtaining the Independent Occurrence Probability (IOP) of each OS of the desired order using Eq. R1-6. The first value significance measure (VSM1) can then be calculated according to Eq. R1-9. Having obtained the IOP and COM consequently the "Association Strength Matrix (ASM)" is calculated, (according to Eq. R1-4, and 6) from which the second "Value Significance Measure (VSM2)" is obtained using Eq. R1-10. Having ASM, thereafter the "Conditional Occurrence Probability" (COP) for each desirable pairs of OSs are calculated as the entries of the COP matrix (according to Eq. R1-8). From the Conditional Occurrence Probability the various combinations of Conditional Entropy Measures, i.e. CEM1, CEM2, DCEM are calculated according to Eq. R1-11, 12, and 13.

It is noted that obviously one can select only the desirable OSs of any order in building one or more of the matrix objects of the invention. Moreover, one does not need necessarily to calculate all of the VSMs that have been included in the general algorithm of FIG. 3. FIG. 3 is for showing one basic exemplary embodiment to illustrate the relations and the method and algorithm of calculating or evaluating a number of distinct VSMs that were disclosed in the description.

The interesting and important observation is that the $VSM3_i^{1/2}$, i.e. Conditional Entropy Measure of type 1 (Eq. R1-11), has followed the Frequency of Occurrence (FO) or equivalently the Independent Occurrence Probability $iop_i^{1/2}$ (Eq. R1-7). That means the behavior of the entropy of $OS_i^1$ knowing the rest of the composition (Eq. R1-11) is almost independent of the interrelationships of the OSs in this composition. So knowing the rest of the composition does not affect the general form of the CEM1 from the independent occurring entropy. i.e the $-iop_i^{k|l} \log_2 iop_i^{k|l}$ which will be quite similar to the IOP or FO.

However, the $VSM4_i^1$, i.e. Conditional Entropy Measure of type 2 (Eq. R1-12), has only followed the Association Strength Number (ASN) and although much less noisy but follow the OSs with high Independent Occurrence Probability $iop_i^{1/2}$ (Eq. R1-7). That means the behavior of the entropy of the rest of composition knowing the $OS_i^1$ depends on the ASN and strength of the $OS_i^1$ association (Eq. R1-10 or 12) and is in favor of the highly popular OSs. So knowing the highly popular OSs contribute greatly to the Conditional Entropy Measure of type 2 (Eq. R1-12).

More importantly is the behavior of DCEM, the sum of DCEM is zero but it has negative values for highly popular (large FO) OSs. That means for those popular OSs who have many real associates the net entropy or information contribution is negative while for the less popular is positive. An interpretation could be given that all OSs of the composition are there to describe and give information about the popular OSs who have real (strong enough) associations. It implies that not all the popular OSs are important if they do not have real bounded associates. The real bounding is the reflection of the usage and the patterns of OSs together in the composition. In other words those OSs having a high value significance are usually the popular ones but the reverse is not always true.

Another explanation is that most popular OSs have many associates or have co-occurred with many other OSs. Those many other associates have been used in the composition to describe the most popular OSs. In other words a natural composition (good intentioned composed composition) is mostly about some of the most popular OSs of the composition. So it is not only the Frequency of Occurrence that count here but the pattern of their usage and the strength of their association (which is asymmetric). In conclusion the negative DCEM means other OSs are giving away information about those OSs with negative DCEM. This feature can be useful for keyword extraction or tagging or classification of documents beside that it shows the importance and significance of the OS having negative DCEM.

Those OSs with the negative DCEM or high ASN can be used for classification of compositions. However investigation of the differences in the various VSMs can also reveal the hidden relationships and their significance as well. For example if an OS has gained a better normalized rank in $VSM5_i^1$ compared to $VSM1_i^1$ then that can point to an important novelty or an important substance matter. Therefore those experts in the art can yet envision other measures of significance employing one or more of these VSMs without departing from scope, concepts and the purpose of this invention.

It is also evident that at this stage and in accordance with the method and using one or more of the participation matrix and/or the consequent matrices one can still evaluate the significance of the OSs by building a graph and calculating the centrality power of each node in the graph by solving the resultant Eigen-value equation of adjacency matrix of the graph as explained in patent application Ser. No. 12/547,879 now U.S. Pat. No. 8,452,725 and the patent application Ser. No. 12/755,415 now U.S. Pat. No. 8,612,445 which are incorporated by reference here again.

Figure 5:
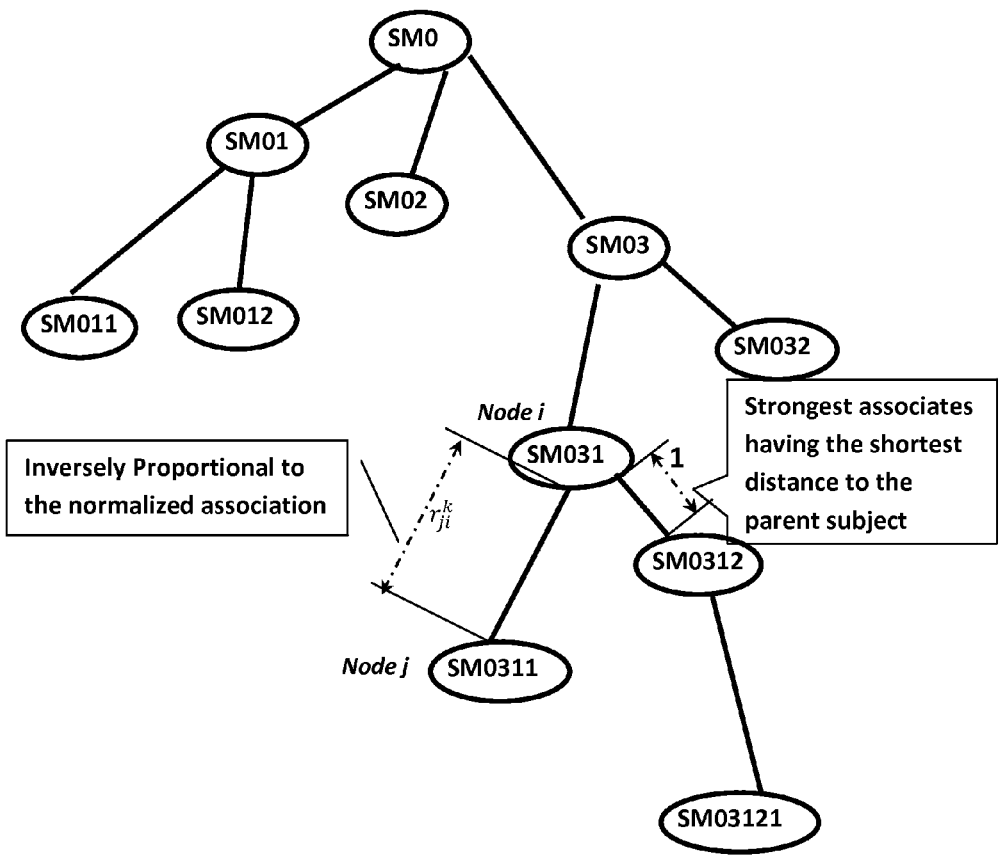
FIG. 5: shows an exemplary way of illustrating the knowledge map for the requested subject matter in which the nodes are placed based on their association strength thereby visually demonstrating the closeness and significance of each node to each there in the context of the BOK assembled for a subject matter.

In the FIG. 5 of the incorporated reference. i.e. the patent application Ser. No. 12/939,112 now U.S. Pat. No. 8,401,980 B2, the block diagram of one basic exemplary embodiment in which it demonstrates a method of using the association strengths matrix (ASM) to build an Ontological Subject Map (OSM) or a graph was shown. The map is not only useful for graphical representation and navigation of an input body of knowledge but also can be used to evaluate the value significances of the OSs in the graph as explained in the patent application Ser. No. 12/547,879 entitled "System and Method of Ontological Subject Mapping for knowledge Processing Applications" filed on Aug. 26, 2009 by the same applicant, now U.S. Pat. No. 8,452,725. Utilization of the ASM introduced in this application can result in better justified Ontological Subject Map (OSM) and the resultant calculated significance value of the OSs.

The association matrix could be regarded as the adjacency matrix of any graphs such as social graphs or any network of anything. For instance the graphs can be built representing the relations between the concepts and entities or any other desired set of OSs in a special area of science, market, industry or any "body of knowledge". Thereby the method becomes instrumental at identifying the value significance of any entity or concept in that body of knowledge and consequently be employed for building an automatic ontology. The VSM1, 2, ... $5^{k|l}$ and other mathematical objects can be very instrumental in knowledge discovery and research trajectories prioritizations and ontology building by indicating not only the important concepts, entities, parts, or partitions of the body of knowledge but also by showing their most important associations.

Various other value significance measures using one or more functions, matrices and variables can still be proposed without departing from the scope, spirit, and the concepts introduced in this invention. For instance sum of the elements of the Co-Occurrence Matrix (COM) over the row/column can also be considered as yet another VSM.

Nevertheless, one might prefer to use VSM of VSM2, VSM4, or VSM5, for her/his application, which takes into account the usage and pattern of usage of OSs to each other in the form of the defined exemplary association strength as shown in FIG. 1 of the incorporated reference. i.e. the patent application Ser. No. 12/755,415, now U.S. Pat. No. 8,612,445.

The VSM has many useful and important applications, for instance the words of a composition with high normalized VSM can be used as the automatic extraction of the keyword and relatedness for that composition. In this way a plurality of compositions and document can be automatically and much more accurately be indexed under the keywords in a database. Another obvious application is in search engines, webpage retrieval, and many more applications such as marketing, knowledge discovery, target advertisement, market analysis, market value analysis of economical enterprises and entities, market research related areas such as market share valuation of products, market volume of the products, credit checking, risk management and analysis, automatic content composing or generation, summarization, distillation, question answering, and many more.

In the next section the value significances of the lower order OSs, e.g. words, are used to evaluate the value significances of larger parts of the composition e.g. paragraphs, sentences, or documents of a collection of documents.

II-III—VALUE EVALUATION OF THE HIGHER ORDER ONTOLOGICA SUBJECTS

The value significance of higher order OSs, e.g. order l in here, can be evaluated either by direct value significance evaluation similar to the lower order OSs, or can be derived from value significance of the participating lower orders into higher order. Conveniently one can use the $\text{VSMx}_i^{k|l}$ (x=1, 2 ... 5) and the participation matrix $PM^{kl}$ to arrive at the $\text{VSMx}_q^{l|k}$ of higher order OSs or the partition of the composition as the followings:

$$\text{VSMx}_p^{l|k} = \Sigma_p \text{VSMx}_p^{k|l} * pm_{pq}^{kl} \qquad \text{R1-(14)}$$

Eq. R1-(14) can also be written in its matrix form to get the whole vector of value significance measure of OSs of order l|k (l given k). i.e. $\text{VSMx}^{l|k}$, as a function of the participation matrix $PM^{kl}$ and the vector $\text{VSMx}^k$.

Moreover other methods of value significance such as the ones introduced in the patent application Ser. No. 12/939,112 now U.S. Pat. No. 8,401,980 B2, or the patent application Ser. No. 12/755,415 now U.S. Pat. No. 8,612,445, incorporated as a reference here again, can be employed. Again the most convenient one could be:

$$\text{VSM1}^{l|k} = (PM^{kl})' * \text{VSM1}^{k|l} = (PM^{kl})' * FO^{k|l} \qquad \text{R1-(15)}$$

which can be shown to be a special case of Semantic Coverage Extent Number (SCEN) introduced in the provisional patent Ser. No. 12/755,415 now U.S. Pat. No. 8,612,445 and incorporated by reference here again, when the similarity matrix (see the Ser. No. 12/755,415 application) is simply $SM^{l|k} = (PM^{kl})' * PM^{kl}$ and $SCEN_i^{l|k} = \Sigma_j sm_{ij}^{l|k}$.

Depends on the application, the size of the composition, available processing power and the needed accuracy, one can select to use one or more of the Value Significance Measures (VSMs) for the desired applications.

Considering that the motivation for calculating the $\text{VSMx}^{l|k}x$, e.g. $\text{VSMx}_i^{2|1}$, is to select the most merit-full partitions from the composition for the desired application, e.g. as a distilled representatives of the body of knowledge of the input composition. Hence VSMx are more useful when they are normalized. Therefore slight change in the normalized values of $\text{VSMx}_i^{k|l \cdots or \, 2|l \cdots}$ can change the outcome of the applications that uses these values quite considerably.

Also important is that either of $CEM1^{k|l}$ or $CEM2^{k|l}$ can be also used (after multiplying either one by $FO_i^{k|l}$) for measuring and evaluating the real information of the composition in terms of bits which could be considered as yet another measure of value significance for the whole composition or the partitions therein.

Again depends on the application and the system capability performing the method and the algorithm one can chose the suitable VSM for that particular application.

In regards to VSM evaluation of higher order OSs in general, yet more conveniently, (also for faster computation), after evaluating the value significance measures of OSs of order l, from the participation information contained in $PM^{kl}$, one can proceed to evaluate the Value Significance Measures (VSMx) of OSs of other orders, say OSs of the order l+r and |r|≥0, from the VSMx of the OSs of the order l as the following:

$$\text{VSMx}(OS^{l+r}|\text{VSMx}^{l|k}) = \text{VSMx}^{l+r|(l|k)} = \text{VSMx}^{l|k} \cdot PM^{l,l+r} \qquad \text{R1-(16).}$$

Figure 8:
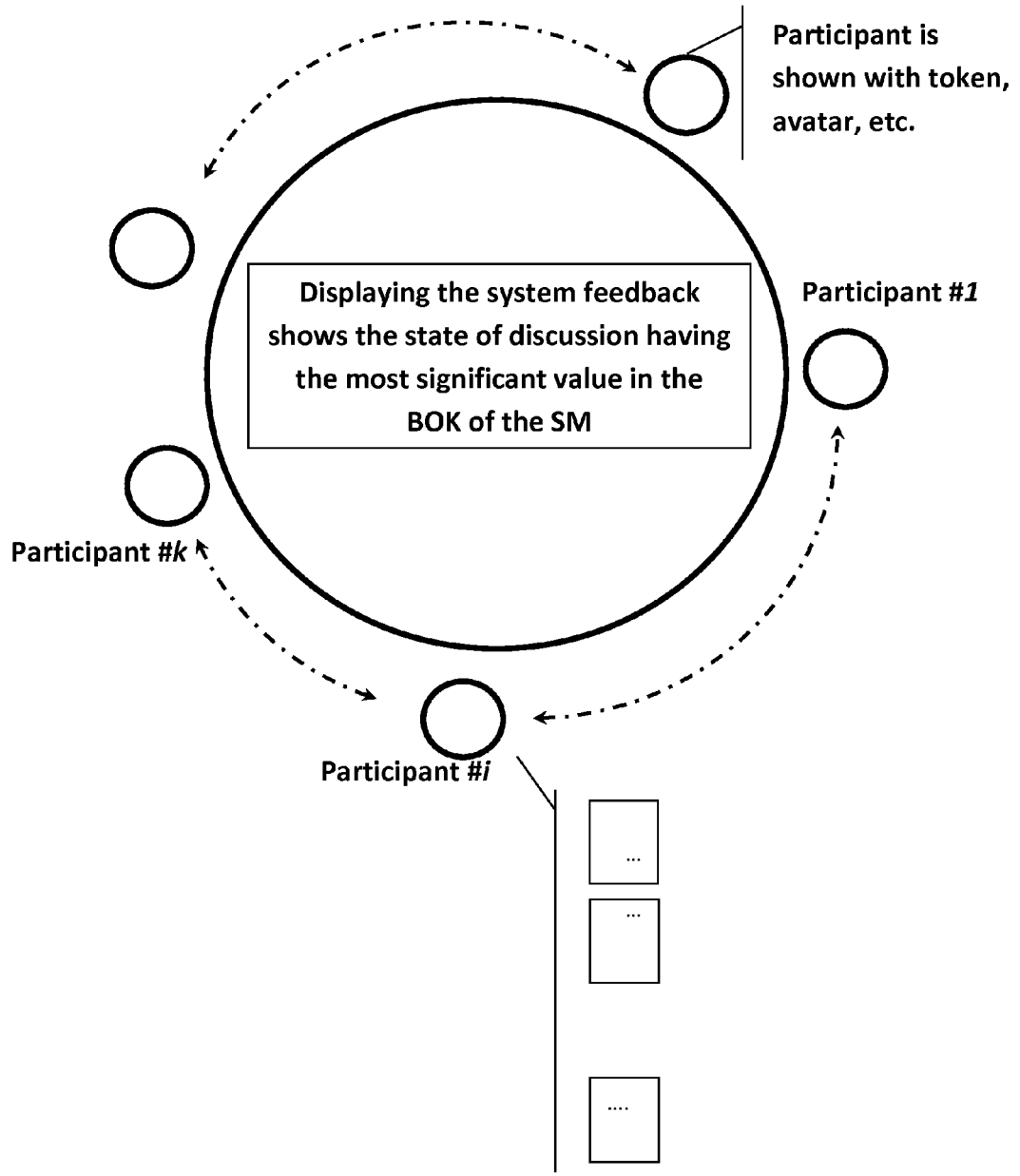
FIG. 8: shows another exemplary embodiment of an ISKDS with online participants wherein the system monitor and give the most updated piece of knowledge about the subject for the participants to see which is further customized for each participant in which for example the user can see the sketch of different forms of the knowledge representation about the subject matters of the discussion.

A composition, e.g. a single document, is entered to the system of FIG. 8 of the patent application Ser. No. 12/939, 112, now U.S. Pat. No. 8,401,980, which is incorporated by reference here again. The system parse the composition, i.e. the document, into words and sentences, and builds the participation matrix showing the participation of each of desired word into some or all sentences of the composition. Then the system, using the algorithm, calculates the COM and ASM and calculates the VSM/s for each sentence. The summarizer then selects the desired number of the sentences (having the desired range of VSM) to represent to a user as the essence, or summary, of the input document. One might choose the different ranges or parts of the VSM for other intended applications.

At the same time the method and the system can be employed for clustering partitions of the compositions, e.g. sentence in the above case, by simply grouping those partitions having almost the same VSM in the context of the given input composition.

Again in one particular and important case, consider the input composition to be a large number of documents and the preferred PM matrix is built for $PM^{1,5}$ (participation of words, k=1, to document, l=5), which is used to subsequently calculate $VSMx^{5|1}$. The resulting $VSMx^{5|1}$ can therefore be used to separate the documents having the highest merits (e.g. having top substance, most valuable statements, and/or well rounded) within this large collection of the document. In this exemplary case, the winner has the highest VSM after a fair competition, for scoring higher VSMs, with many other documents contained in the collection. Also shown in the FIG. 8 of the patent application Ser. No. 12/939,112, now U.S. Pat. No. 8,401,980, which is incorporated by reference here again, are the data storages storing the compositions, participation matrixes, the partitions of the compositions, and the VSMx of the partitions of the composition to be used by other applications, middleware, and/or application servers.

Those skilled in the art can store the information of the PMs in equivalent forms without using the notion of a matrix. For example each raw of the PM can be stored in a dictionary, or the PM be stored in a list or lists in list, or a hash table, or any other convenient objects of any computer programming languages such as Python, C, Perl, etc. Such practical implementation strategies can be devised by various people in different ways. The detailed description, herein, therefore uses a straightforward mathematical notions and formulas to describe one exemplary way of implementing the methods and should not be interpreted as the only way of formulating the concepts, algorithms, and the introduced measures. Therefore the preferred mathematical formulation here should not be regarded as a limitation or constitute restrictions for the scope and spirit of the invention.

In summary, one can follow the teachings and the disclosed methods of the referenced patent applications to arrive at evaluating the various parameters proposed in those applications. In particular the variables and parameters such as "Semantic Coverage Extent Number", i.e. the SCEN parameter introduced in the incorporated reference patent application Ser. No. 12/755,415, now U.S. Pat. No. 8,612,445 B2, and/or the "association strength matrix" (ASM), and the different types "value significance measures" (VSMs) of lower and higher order ontological subject of a given corpus or composition which were introduced in the incorporated reference patent application Ser. No. 12/939,112, now U.S. Pat. No. 8,401,980 B2.

These variables, e.g. SCEN, ASM, different VSMs, are very important since they are the measure of the value and significance of the OSs of the corpus and can be used to filter, and select the OSs or partitions of the corpus based on the desired features such as the intrinsic value of a partition, popularity, authoritativeness, novelty, credibility etc. Effectively these variables and parameters can be viewed as scores of merit for the partitions. In the exemplary embodiments of this disclosure the intended corpus is a Body Of Knowledge (BOK) that is assembled by the system of this invention in response to a request from a computer program agent or a human user or client. However as will be explained in one of the embodiment of this invention, the BOK can also be provided by the user/client as well.

Body of knowledge (BOK) is a collection of one or more ontological subjects in general which are usually (but not necessarily) are related to a subject matter. For instance if one input a subject matter as a query to a search engine and download all the results given by the search engine then this would form a body of knowledge about that subject matter. In another instance the BOK might be news feeds about a piece of news from single or different sources. Other examples of a BOK are: a collection of short and/or long messages and comments such as a group of twitter messages, the visitor's comments to a blog, the content of several books related to a subject matter, a collection of research papers, a collection or group of patent disclosures, or a group of movies or multimedia content. Obviously the largest BOK would be the whole stored contents over the internet.

Participation matrix, or any other objects of this invention, can be stored numerically or by any other programming language objects such as dictionaries, lists, list of lists, cell arrays, databases or any array of data, or generally any suitable data structure of any computer programming language to manipulate and/or store the various mathematical or data objects of the present application, which are essentially different representation forms of the data contained in the PM/s or other objects of the present application. It is apparent to those skilled in the art that the formulations, mathematical objects and the described methods can be implemented in various ways using different computer programming languages or software packages that are suitable to perform the methods and the calculations.

Moreover storage of any of the objects and arrays of data and the calculations needed to implemented the methods and the systems of this invention can be done through localized computing and storage media facilities or be distributed over a distributed computer facility or facilities, distributed databases, file systems, parallel computing facilities, distributed hardware nodes, distributed storage hubs, distributed data warehouses, distributed processing, cluster computing, storage networks, and in general any type of computing architectures, communication networks, storage networks and facilities capable of implementing the methods and the systems of this invention. In fact the whole system and method can be implemented and performed by geographically distant computer environments wherein one or more of the data objects and/or one or more of the operation and functions is stored or performed or processed in a geographically different location from other parts storing or performing or processing one or more of the data objects and/or one or more of the operations or functions of this disclosure.

The invention is now disclosed in details in reference to the accompanying figures and exemplary cases and embodiments in the following sub sections.

The proposed system disclosed in this invention is designed as a tool and environment for assisting clients and users of information and knowledge to quickly reach at the part of the knowledge that they are looking for or discovering new knowledge about one or more ontological subjects of the universe. The system itself is an active participant of the Interactive/Social Knowledge Discovery sessions (ISKDS) and furthermore it is intended to be easier and effective to use, more fun and incentive for client and users, than the current systems and methods of knowledge retrievals and discoveries.

Referring to FIG. 1, there is shown one brief and simplified schematic block diagram of the system of "Interactive Knowledge Discovery Session" or as we called here on IKDS. We first explain the Interactive part of the invention and later launch into explaining the Interactive and/or Social part of the invention. The system consists of computer hardware and programs to perform the method and algorithm disclosed in the provisional patent application Ser. Nos. 12/755,415 and 12/939,112 to evaluate the value significance of ontological subjects.

As shown in FIG. 1, the system will receive a query that ask or introduce a subject matter for exploration. The system will assemble a body of knowledge (BOK) related to that subject matter. The BOK or the corpus then is partitioned to the desired partitions, built lists of OSs of different orders, built the PMs and evaluate, or become ready to evaluate on demand, the semantic significance and/or value significance measures (VSMs) of the OSs and the partitions according to the teachings and explanation in the above referenced patent applications. Participation matrices (PMs) carry the information of participation of ontological subject in the same or higher order ontological subjects. The VSMs of the OSs (i.e the partitions) of different order can be evaluated for the whole OSs of the same order regardless of their constituent lower order OSs or can be evaluated for those selected OSs containing the main subject matter of the BOK or any other subject matter, which is existed in the BOK, in demand. Having assembled the BOK and built the PMs and having evaluated the VSMs (or the SCEN value from the patent application Ser. No. 12/755,415) of the partitions, then system will get back at the client with several option for displaying the results or the most important pieces of the knowledge related to one or more input subject matters entered to the system by the user/s. The output knowledge are then represented and displayed by various optional methods. As seen in FIG. 1 after getting the list of partitions having scored the predetermined VSMs types and levels there is another selection and editorial block that make the additional editorial on the winner partitions to make them more suitable and readable by the client. The extra editorial and further selection process before sending the response back to the client is not a necessity of the process but it will ensure a better result and quality.

Referring to FIG. 1 again: as seen, the system starts the interactive session and provides services and the responses according to the client requested subject matter and the mode of services. For instance, the client can request a concise essence or summary of the knowledge about a subject matter found in the BOK. Alternatively, the client may ask about a well composed content using the techniques and method of automatic content generation made from the BOK according to, for instance, the patent application Ser. No. 12/946,838 entitled "Automatic Content Composition Generation" filed on Nov. 15, 2010 by the same applicant.

The client can also request a list of documents based on the value and relevancy to the subject matter based on one or more of the SCEN (application Ser. No. 12/755,415) or VSMs (application Ser. No. 12/939,112) measures that can be used as merit measures to sort the document based on their overall intrinsic value, substance, novelty, authoritativeness etc., in the collected sets of the documents in the BOK.

More importantly as shown in the FIG. 1, the client can ask about other subject matters and the content of the assembled BOK of the main subject matter of exploration. As will be explained in FIG. 3a,b and 4 a-c, the system provides user interfaces that a client can navigate and identifies the most important or the strongest associates of the main subject matter in the context of the BOK and request about the information or the knowledge expressing the relationships between two or more of the subject matters from the BOK. The answer in this form again would be the partitions of the BOK that contain the desired subject matter/s and have the predetermined range of value significance measures (VSMs). The system has the option to use one or more measures of the VSMs. The client and users are provided with visually pleasing graphic user interfaces and button and icons so that they can select their desired mode of service e.g.:

1. A summary,
2. bulleted summary,
3. dense summary,
4. query specific summary from the BOK,
5. graphs of associated subject matters and or ontological subject maps (OSM),
6. in demand, or query-based, automatic content composing,
7. content containing two or more subject matters,
8. answers to questions or question answering,
9. list of the highest value or highest relevancy documents from the BOK,
10. novelty detection or novel information about the queried subject matter in the context of the BOK,
11. query suggestion, idea and question proposition, and research guidance; and
12. any combination of the above services.

Obliviously the system can have a default mode of response representation from the list above or any other way desired. These lists of services are just few exemplary modes of services for illustration and explanation only. Those skilled in the art can envision various other modes of services and response using the main teaching of the invention in regards to providing interactive environment with the computer implemented systems and obtaining relevant responses using suitable methods such as one or more of the methods disclosed in this invention or the reference applications which are incorporated herein.

The results of the service and system can be displayed on any desirable display apparatus and particularly electric display devices such as computer monitor, CRT or LCD, plasma based, laser displays, projection devices, touch sensitive displays or touch screen displays, projectors, and the like. Particularly, those displays that, either by way of software or hardware, are able to react to a user's input or impression, such as pointing and clicking on pixels graphically, or by touching or reading user's expression, voice commands, motions, thought etc. Furthermore, the display devices also mean any portable device having a display such as mobile devices, portable and mobile projectors, laptops and the likes.

Referring to FIG. 2a now, one of the above exemplary services is further illustrated. FIG. 2a shows one exemplary way of displaying and presenting the most significant pieces of knowledge related to queried subject matter in the form of bulleted or a short list concise statements (sentences, paragraphs) found in the BOK which scored the desired ranges of Value significance Measures (VSMs) of the desired aspect of the value significance. The desired range simply can mean the partitions that scored the highest VSM1.

The partitions with high VSM/VSMs containing the subject matter or representing the essence of the BOK are usually the most credible pieces of information found in the BOK and having higher relevance and rich semantics conveying often an important fact or important attributes of the subject matter. That is because they have either the highest semantic coverage (e.g. SCEN or VSM1) or containing the most informative contributive ontological subjects of the corpuses (e.g. having high VSM2, 3, 4, or 5, etc. and/or a predetermined function of these parameters).

Figure 2B:
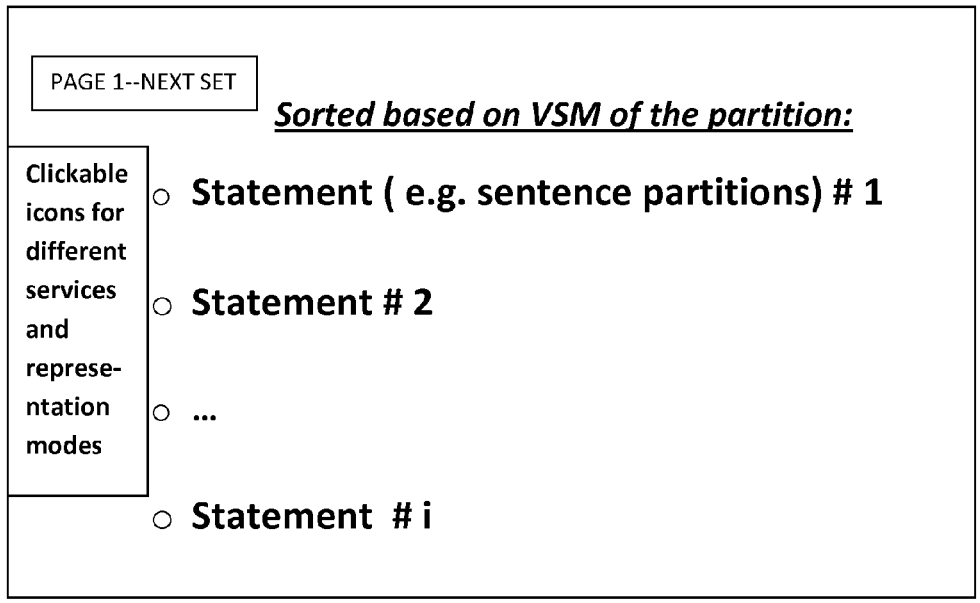
FIG. 2b: shows another exemplary result of the IKDS in response to the user/s request for information in which the knowledge about a subject matter is represented in the form of listed most credible statements found in the assembled Body Of Knowledge (BOK) related to the requested subject matter in which further user's interfaces are provided for better navigation through a multipage output and more optional representation modes.
Figure 2B:
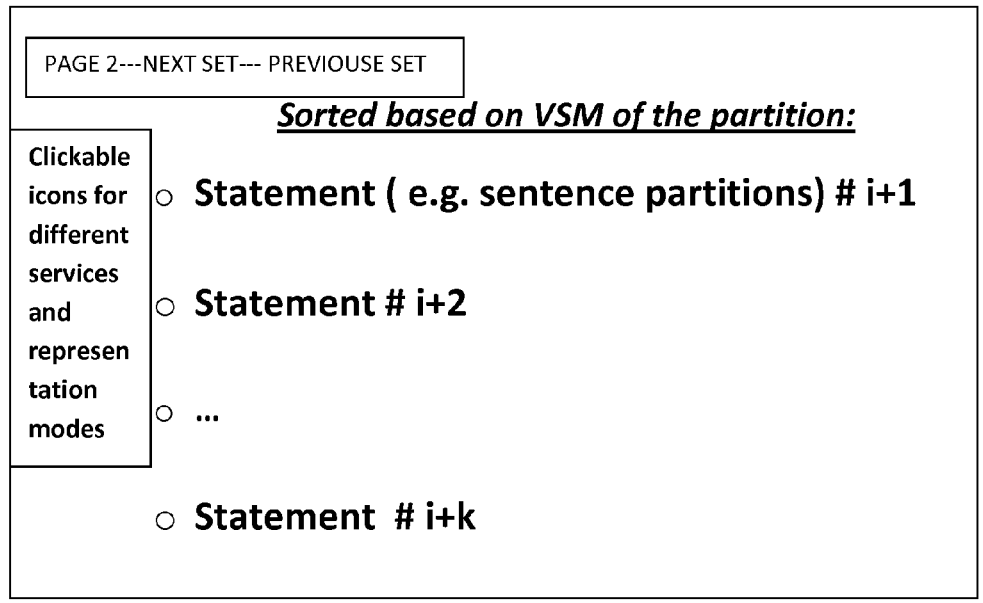

FIG. 2b shows another option that the summary is presented in more than one pages with the user interface icons for the user to go back and forth within the presentation of the BOK in the form of a bulleted high valuable partitions of the BOK that instantly demonstrate the context of the BOK. Depicted also in FIG. 2b, are the clickable or point-able icons displaying other optional services to the viewer of the display to chose from.

Alternatively the results can be a summarized essence of the BOK or in general or more specifically about the main subject matter by including a desired number of highest valuable partitions and or the most novel partitions of the BOK in the results of the interactive session.

One import and very instrumental version of displaying the most valuable partition of the BOK is to display the partitions of the BOK that have the highest density value (e.g. highest value per symbol, or highest value per character or highest value per word). Following the notations, variables, formulations and the methods disclosed in the patent application Ser. No. 12/939,112 we define the density value significance measure as the following:

$$DVSMx_i^{k|l} = \frac{VSMx_i^{k|l}}{Len(OS_i^k)} \quad (4)$$

where $DVSMx_i^{k|l}$ is the density of Value Significance Measure (VSM) of type x (x=1, 2, 3, . . . ) of the ith Ontological Subject of order k (i.e. $OS_i^k$), and the len is indicative of length of the $OS_i^k$ such as for example the total number of characters or the total number of words in sentence or a paragraph, document etc, or any other desirable measure of length.

This measure usually gives the means to select and filter the shortest statements having high value significance (according to at least one significance aspect) in the BOK which is very instrumental in obtaining the essence of a BOK and quickly find a clue about the context of the BOK.

In the exemplary embodiments of FIGS. 2a and 2b, the system also provides another service by the ISKDS system in which after the system reads and organize the BOK and analyzes the content and evaluate the values and association of ontological subjects contained in the BOK, the system become ready to answer the question in the context of the BOK. When the client ask a question the ISKDS system will find the partition with the highest value significance of the BOK that express a fact or explain about the ontological subjects of the question. That is fairly straight forward for the ISKDS system since the system has all types of participation matrices and knows which OS has participated in which of other partitions (or ontological subjects) and can easily find the partitions that have a mention of the ontological subjects in the question. Usually the partitions that have the highest VSM then provide the best possible answer in the context and the content of the assembled or the given BOK. Also usually the larger the BOK the better and more accurate the response and answers would be, not only for the question answering session but also for all other services that ISKDS system will provide to users as will be described throughout this disclosure.

Figure 3A:
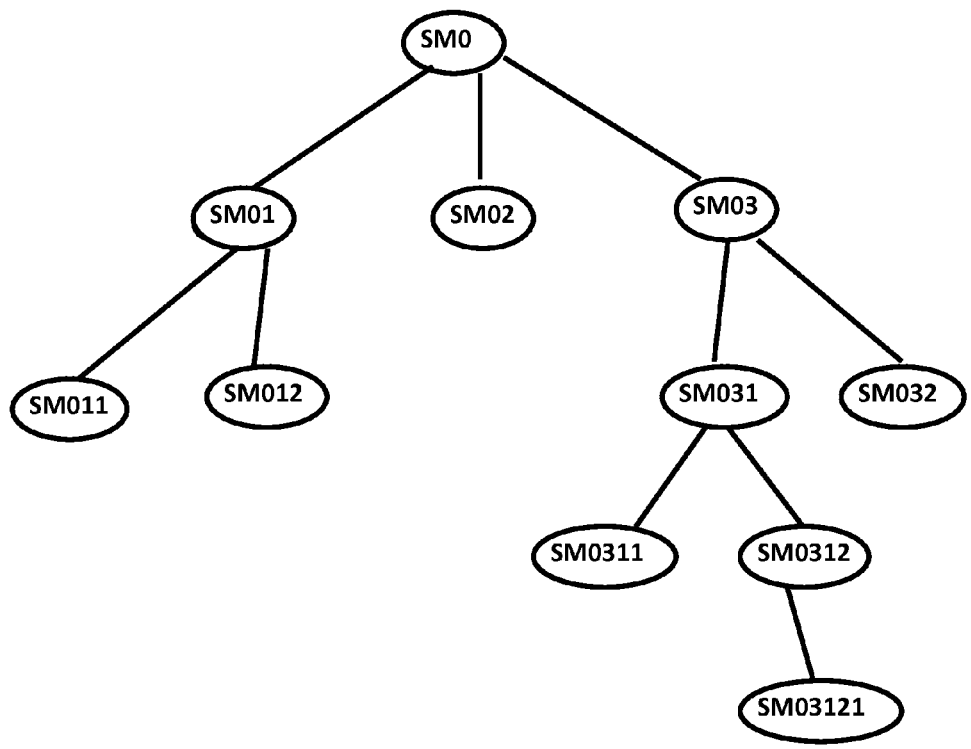
FIGS. 3a and b: show other exemplary outputs of the IKDS in response to the user/s request for knowledge about a subject matter in the form of a multilayer map in which the most significant subjects associated with the main subject matter are mapped according to the present invention.
Figure 3B:
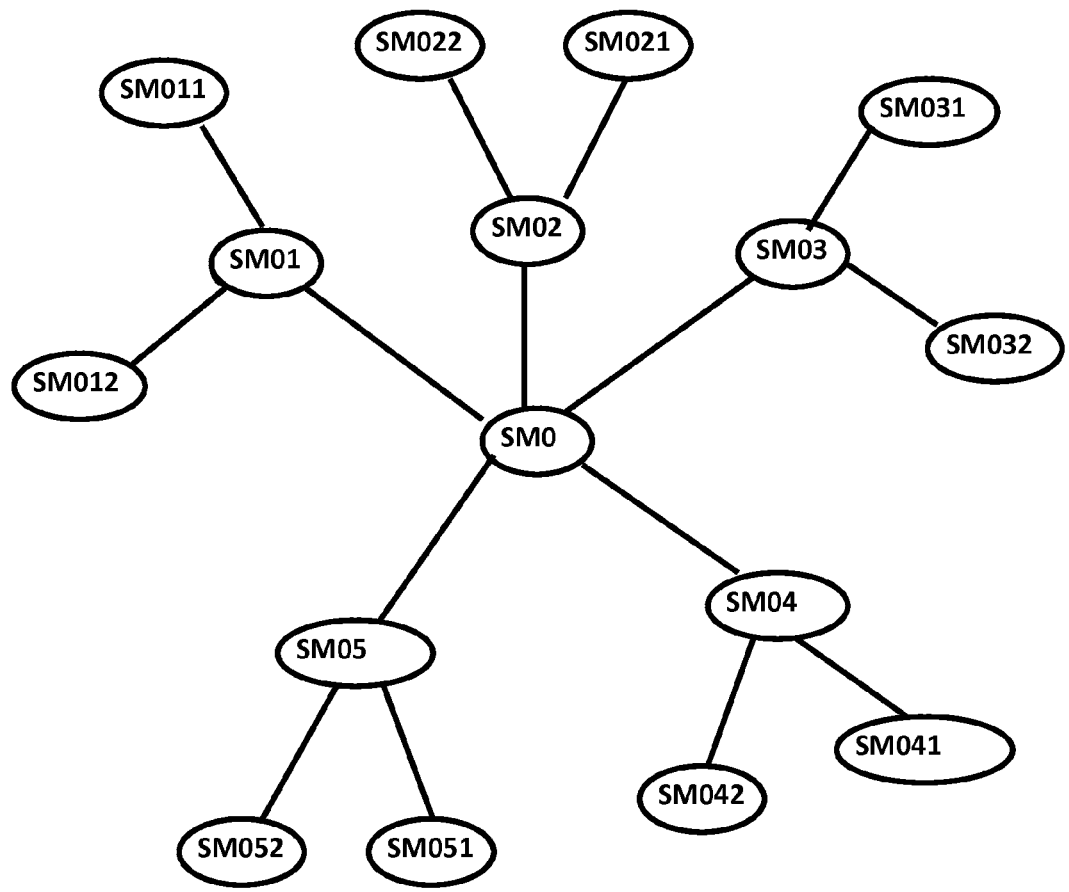

Referring to FIGS. 3a and 3b now, it shows other further exemplary ways of representing the context of the BOK at a glance as an option in the interactive knowledge discovery session. These embodiments show the graphical semantic representations of a subject matter in the context of the assembled BOK at a glance. In fact, in these embodiments the system will provide a backbone graph indicating the relationships between the concepts and entities of the BOK and therefore visualizes the true context of the BOK and consequently reveals the context of the universe of the body of knowledge.

As seen in these optional embodiments the most important associates of the main subject matters, and their own associates, are shown as a node in a graph that shows their connection and their importance. The indices of the associated subject matter are configured in a way to show their association route through their parents' nodes up to the main subject matter of graph which is shown by SM0 in FIGS. 3a and 3b. For instance, the node SM012 means this node is representative of a subject matter (i.e. an OS) that is the second associate of SM01 which itself is the first associate subject matter of the main subject matter SM0. The orders, i.e. the first and the second etc., are based on predetermined criteria but, for instance, and usually they are ordered based on their strength of associations to their parents. Of course in the actual display the actual subject matter, e.g. the name of the entity, concept, picture, symbol etc, will be or can be displayed.

FIG. 3a shows the graph in the form of hierarchical tree while the in FIG. 3b the graph is basically free form but can be viewed as though the associates at each level are distributed along a circle co-centered by the SM0. FIG. 3b, make a better use of the display space and perhaps more pleasing while the 3a shows hierarchy of associations in a tree like form. One can select either representation depiction or another ways of graph representation without departing from the scope of showing the association of subject matter within the context and contents of the BOK. The semantic graphs of 3a and 3b can be strongly connected (many nodes are connected to each other) or uniquely contented which means having been connected to only higher level parent as is the case in FIG. 3a and FIG. 3b. In the extreme case the graph can display all the lower order OSs, e.g. the words that have been found in the BOK, as a node and show all the connections using for instance the co-occurrence matrix as an adjacency matrix of the graph.

Figure 4A:
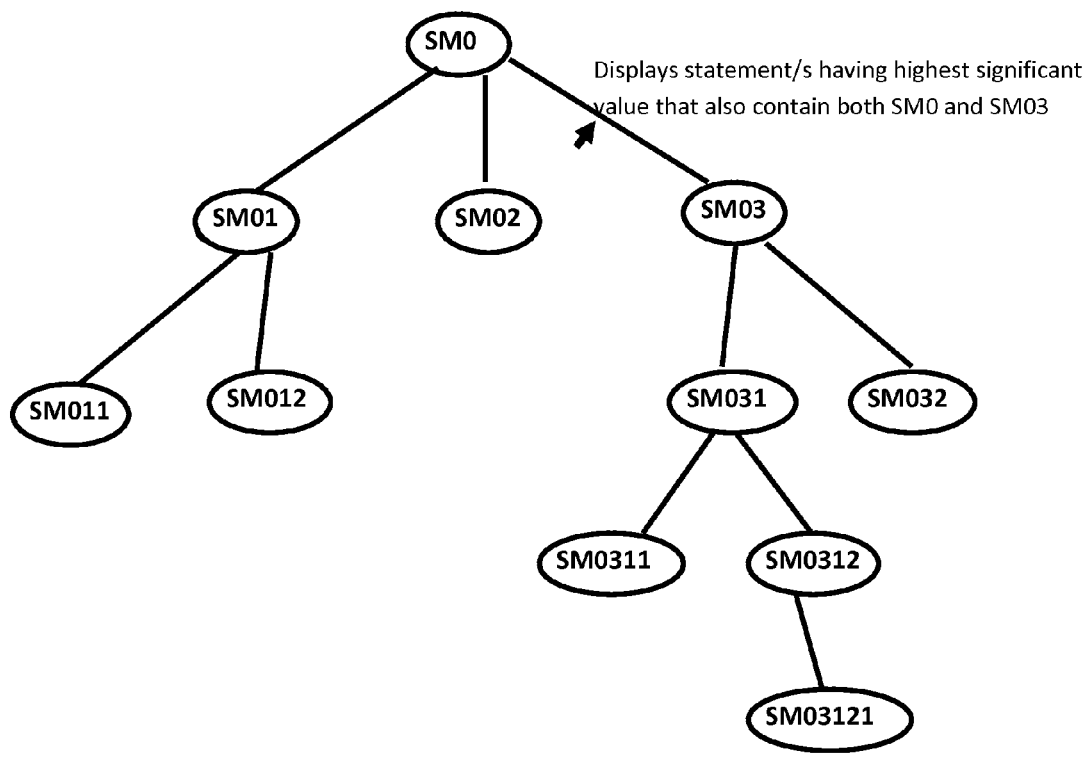
FIG. 4a: shows an exemplary way of navigating over the map and getting the most credible partitions of the BOK contains the selected subject matters (nodes) in the map by pointing on the edges of the graph.
Figure 4B:
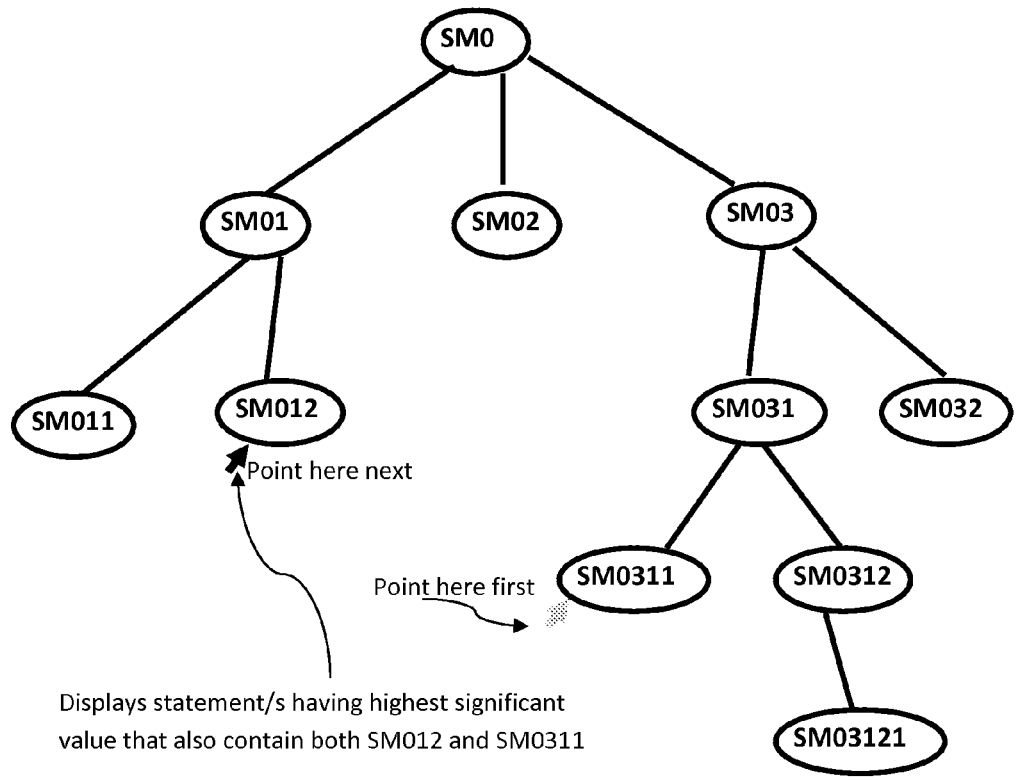
FIG. 4b: shows another exemplary way of navigating over the map and getting the most credible partitions of the BOK contains the selected subject matters (nodes) in the map by pointing and confirming the nodes for which the information is sought.
Figure 4C:
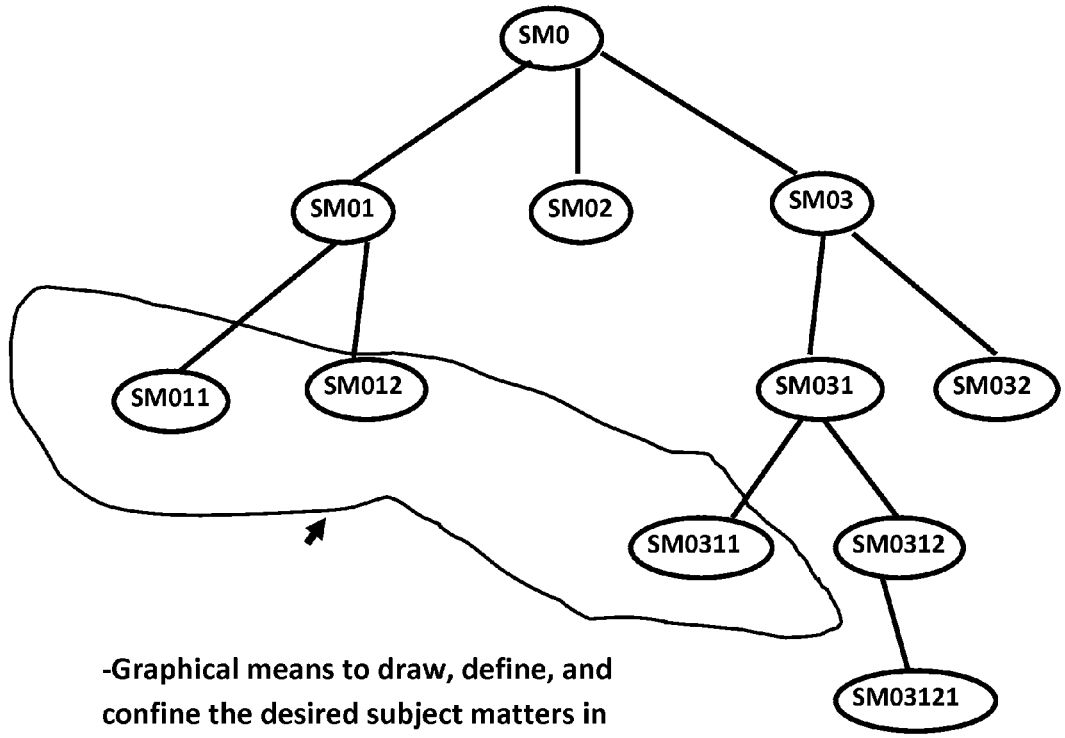
FIG. 4c: shows another exemplary way of navigating over the map and getting the most credible partitions of the BOK contains the selected subject matters (nodes) in the map by drawing and defining an areas of the map for which the knowledge is sought about.

Referring now to FIGS. 4a, 4b, and 4c: these embodiments are similar to the exemplary embodiment of graphical semantic representation of BOK as FIG. 3a, visually showing the context of the BOK, whereas there is also provided graphical interfaces that facilitate the exploration by pointing and clicking on the nodes or the edges to see the relation between each two or more nodes.

As shown in FIG. 4a, user interface is provided along with the semantic graph of the BOK that visually displaying the context of the BOK in which when a user put a curser on any edge between any two nodes the system shows at least one statement that expresses the relationships of the two nodes.

In FIG. 4b, user is further provided with graphical capabilities in which user can identifies any two nodes (which might not be directly connected to each other in the graph) and get the expression about the relationships of the two identified nodes (if there exist such expression/s in the BOK). As shown in this exemplary depiction the user can point on one and click on it and then point on the second node and click again whereupon the system displays a partition of the BOK that contains the respective OSs of the identified nodes and having a high value significance calculated by one or more or combination of VSMs calculated from the methods disclosed in patent application Ser. No. 12/939,112 or Ser. No. 12/755,415. For instance the expressed partition of the BOK can be selected from those sentences that contain both nodes and have high or highest value significance or having a high or highest dense value significance as given by Eq. 3.

In FIG. 4c: the system provides the graphical means for a user to identify an area, that the user likes to know more about, by drawing a boundary of an area on the graphical map that covers one or more of the nodes in the map. The system therefore will display the partitions of the BOK, e.g. sentences or paragraphs that contains one or more of the nodes or any combination of them.

In these embodiments (FIGS. 4a, b, and c) the system can further provide other options such as providing a whole composed content about the selected nodes that demonstrate a high value content generated from partitions of the BOK.

In FIG. 5, there is shown a graphical representation of the context of the BOK similar to FIG. 3a in which the geometrical length of the edges between nodes is an indication of their association strength. The graphical representation is displayed by selecting the desired number of associates of one or more first level nodes, i.e. subject matters, and for each node and its associate calculate the normalized distance which might be given as the following:

$$r_{ji}^k \propto \frac{\max(ASM_{ji}^k)}{ASM_{ji}^k} \qquad (5)$$

where $r_{ji}^k$ is the distance between node j and node i in the graph and in fact is inversely proportional to the normalized Associating Strength of the $OS_j^k$ to $OS_i^k$ (e.g. normalized versus the highest strength associates of the $OS_i^k$), and $asm_{ji}^k$ is the association strength $OS_j^k$ to $OS_i^k$ which is an element of the Association Strength Matrix (ASM) which was defined by the EQ. 4 in the patent application Ser. No. 12/939,112, now U.S. Pat. No. 8,401,980 B2, from the incorporated references.

As seen from FIGS. 3, 4 and 5, for simplicity and clarity we only connects the nodes to its immediately above parent subject matters and each node or subject matter only connects to its a single parents and it own associates.

Particularly the embodiment of graph shown in FIG. 5 is very important since not only the associates of a chosen subject matter (i.e. the main selected subject matter from the BOK which is usually depicted in the first top level) are mapped and easily convey the context of the BOK to the user but also shows the importance of each subject matter to the main subject matter quite geometrically. The farthest the node is from one another (in each branch) the less strong the bond or their association is.

These figures are few of the possible ways of representing the essence and context of a subject matter's, using the significance value evaluation, in order to facilitate the interactive searching or knowledge discovery session. However other forms of representations and more options or combination of services can be devised without departing from the goal and spirit of these depiction which is to quickly and conveniently give a user or a client the most important knowledge about a subject matter to a user and assist him/her in exploring for more knowledge or discovering new or less known knowledge.

Figure 6:
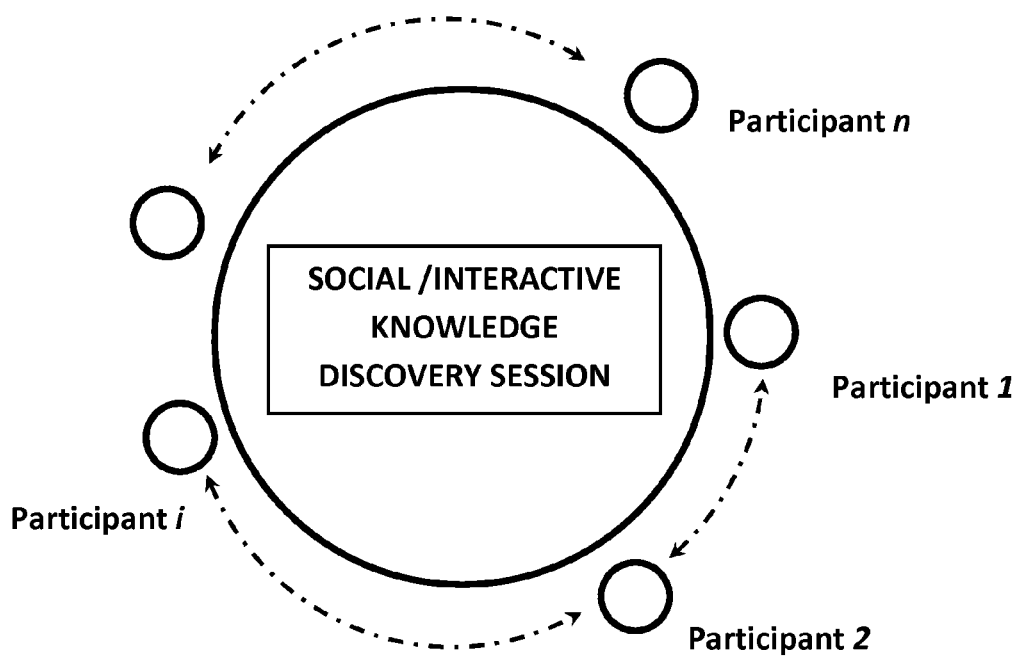
FIG. 6: shows one exemplary embodiment of a "Interactive/Social Knowledge Discovery Sessions (ISKDS)" display with online participants

In FIG. 6, there is provided an interactive searching service that once a user quires the systems about a subject matter the user or the client is guided to an open session that is shared with other users or clients that were looking for knowledge about the same subject matter, and the new user can quickly get an update on the latest findings and the best pieces of information or knowledge found in the respective BOK of the subject matter. The new participant therefore can also join the interactive and social knowledge discovery session and start to gain instant updated knowledge or contribute to the BOK of that session. However since the system is capable of interacting with the user the system itself can be viewed as an active participant and therefore the social interactive knowledge discovery session can always be formed even if there is only one human participant. Although some of the participants might be software agents that are looking to find the information for their own clients.

This embodiment is very instrumental for faster knowledge finding and discovery since at any given time there are a large number of people who are querying search engine about the same subject matter. This configuration will provide a service for general public to share and learn form each other. Since participants are not known to each other the knowledge shared and found by them while the social ISKDS is acting as mediator is highly valuable and credible.

It is noticed that the embodiment of FIG. 6, is very different from social networking providers since firstly the social network providers are not geared toward searching, knowledge finding, discovery, and distillation. Secondly the participants of social networking in each group or bunch are the same people and most of the time are known to each other so the ideas and knowledge among them are not totally uncorrelated and cannot be fresh. Thirdly the participants are required to login to a website which results in exclusion of a large number of casual surfers who do not want to participate in the social networks but nevertheless need to acquire information and knowledge about arising subject matters on the daily basis. And fourthly they do not have automatic methods and means to mediate and be able to measure the value of contents, short or long, and therefore be able to show the most significant pieces of knowledge and information to their client.

This embodiment, FIG. 6, increases the chance of meeting likeminded people significantly, yet having very diverse backgrounds, which will results in much better quality service for knowledge finding and sharing.

Referring to FIG. 6 again, there is shown a schematic of a social search or "Interactive/Social Knowledge Discovery Session (social IKDS or ISKDS)" in which the searcher or client or user are shown graphically as the graphical object or avatars around a virtual table and discussing a common subject matter. In this embodiment each user (or as called in this figure, a participant) sees the most credible and latest discovered or stated pieces of knowledge about his/her subject of interest while each user individually have access and is provided with further services such as the one outlined in the descriptions of the FIGS. 2 to 5. In this embodiment a system can be represented as the mediator or as one of the participants who have the highest volume of content or knowledge about that subject matter of the discussion and knowledge discovery session.

It is also noticed that all the embodiments and configuration can perform essentially as a search engine that provide various content/s packages in response to a query. For example, when the system provides an answer to a query in the form of a list of ranked webpages based on their VSM scores then the service of the system is similar to the current search engines though with different scoring and ranking methods. Therefore, for instance, a user can query the system as a search engine and have the option to be directed to the interactive discussion session related to the queried subject matter like FIG. 6. The system will then present the latest and more valuable partitions of the BOK to that point while user can also migrate or demand other service introduced in the FIGS. 2 to 5.

Figure 7:
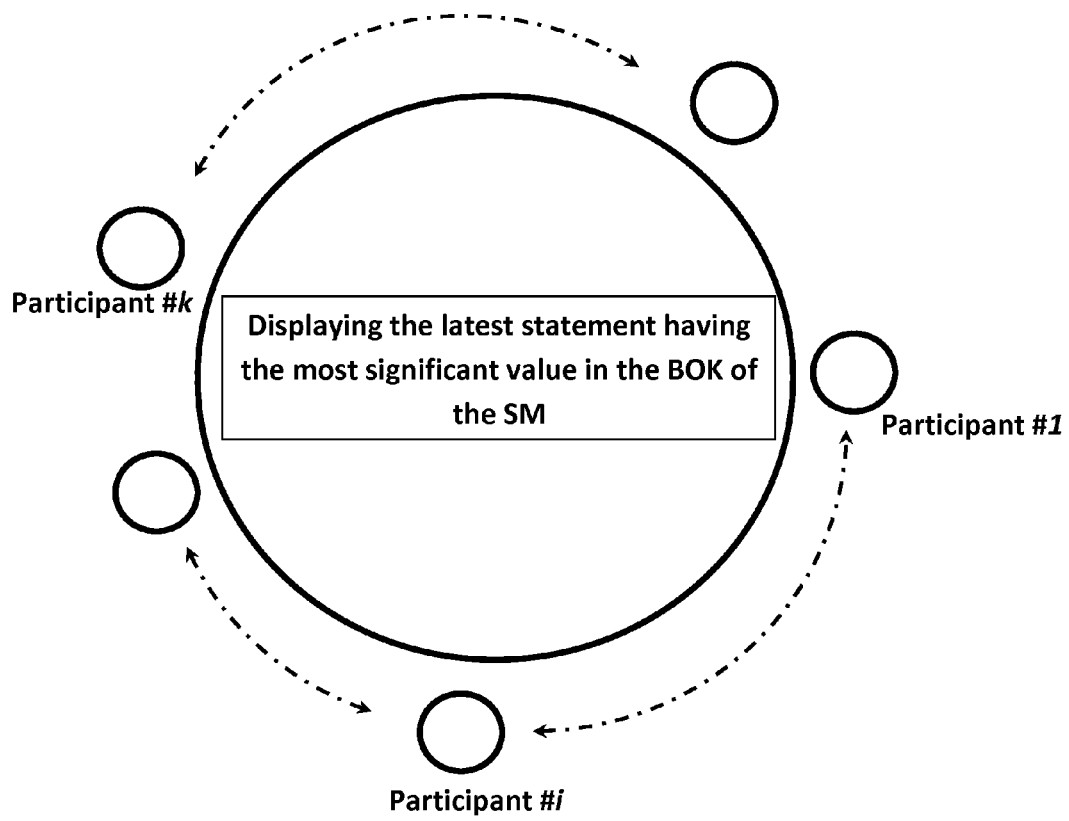
FIG. 7: shows another exemplary embodiment of an ISKDS with online participants wherein the system monitors and gives the most updated piece of knowledge about the subject for the participants to see.

In FIG. 7, for instance, there is shown a round table with participants that are searching or exploring a knowledge discovery session about a subject matter that is common with other users or participants. In this embodiment the system announces the latest most valuable knowledge about the subject matter. The most valuable knowledge is obtained by evaluating the VSM of the partitions of the BOK in the one to one ISKDS case or it's users inputs are added to the BOK or the user's input is evaluated in the context of the previously known knowledge contained in the BOK or simply the most valuable partition is the part that have the highest consensuses which is equivalent to having a highest VSM or dense VSM.

In FIG. 8, there is shown another embodiment similar to FIGS. 6 and 7 in which the option or service is further provided to the participants (e.g. users or clients) for in demand type of information about the social interactive knowledge discovery session (ISKDS). For instance besides seeing the ongoing session and the latest funding about the subject matter, a participant can privately use other services of the system in regards to the subject matter and it's respective BOK. The participant can, for example, order or ask for the maps explained in FIG. 3-5, or ask about the concise essence presentation of the BOK similar to FIG. 2, or ask about the summary, or questioning the system and get the answer back in the form of the most valuable and relevant part of the BOK.

Figure 9:
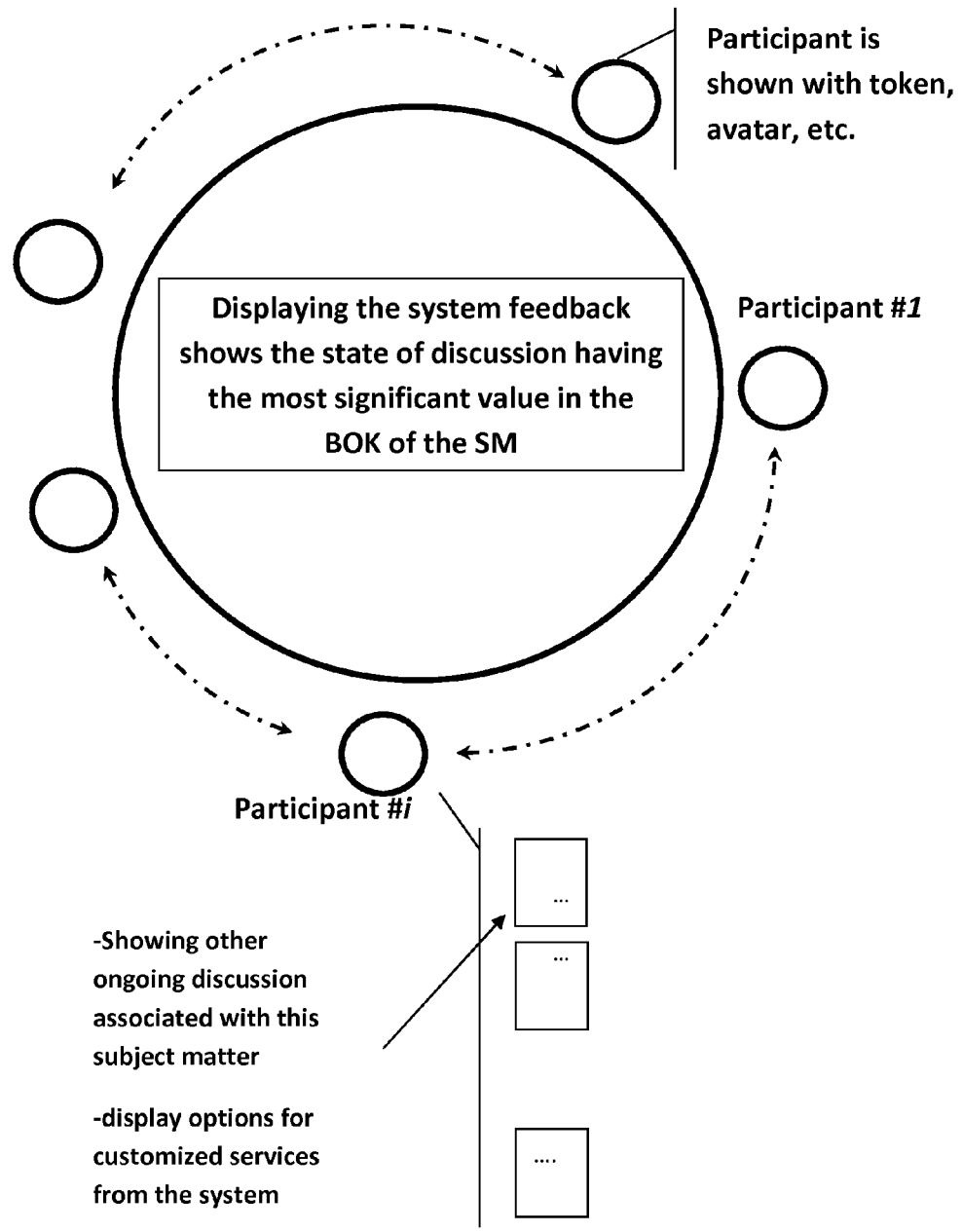
FIG. 9: shows another exemplary social ISKDS wherein other ongoing or offline ISKDS about the most significant associates of the subject matter or any other desired subject is displayed to the participant so that the participant can switch back and forth between the sessions.

Meanwhile the system also have the option to display the other ongoing sessions who's subject matter is associated to the subject matter of the current session and a participant can switch to or become a participant to more than one social ISKDS and gain more perspective of the related subject matters of his/her interest. FIG. 9 shows an embodiment that a participant can see other ongoing session and the results of their discussion or demand the similar services as the one in FIG. 8 to be fetched from another ongoing session which may or may not be related to the subject of the social ISKDS that the participant is currently participating. However the system usually can suggest the most closely related and relevant sessions to the client and client can participate in one or more session and request his desired services from the system. The participants may further be notified about important finding/s in the context of the body of knowledge of the ISKDS after leaving the session.

The participants not only see and share the latest more credible and most valuable findings about a subject matter they can also provide an input and express their conclusion or further reasoning to the system which will become part of the BOK of the subject matter of that social ISKDS and the participant's input can be measured in terms of its credibility, novelty, and generally one or more aspect of its value significance.

Figure 10:
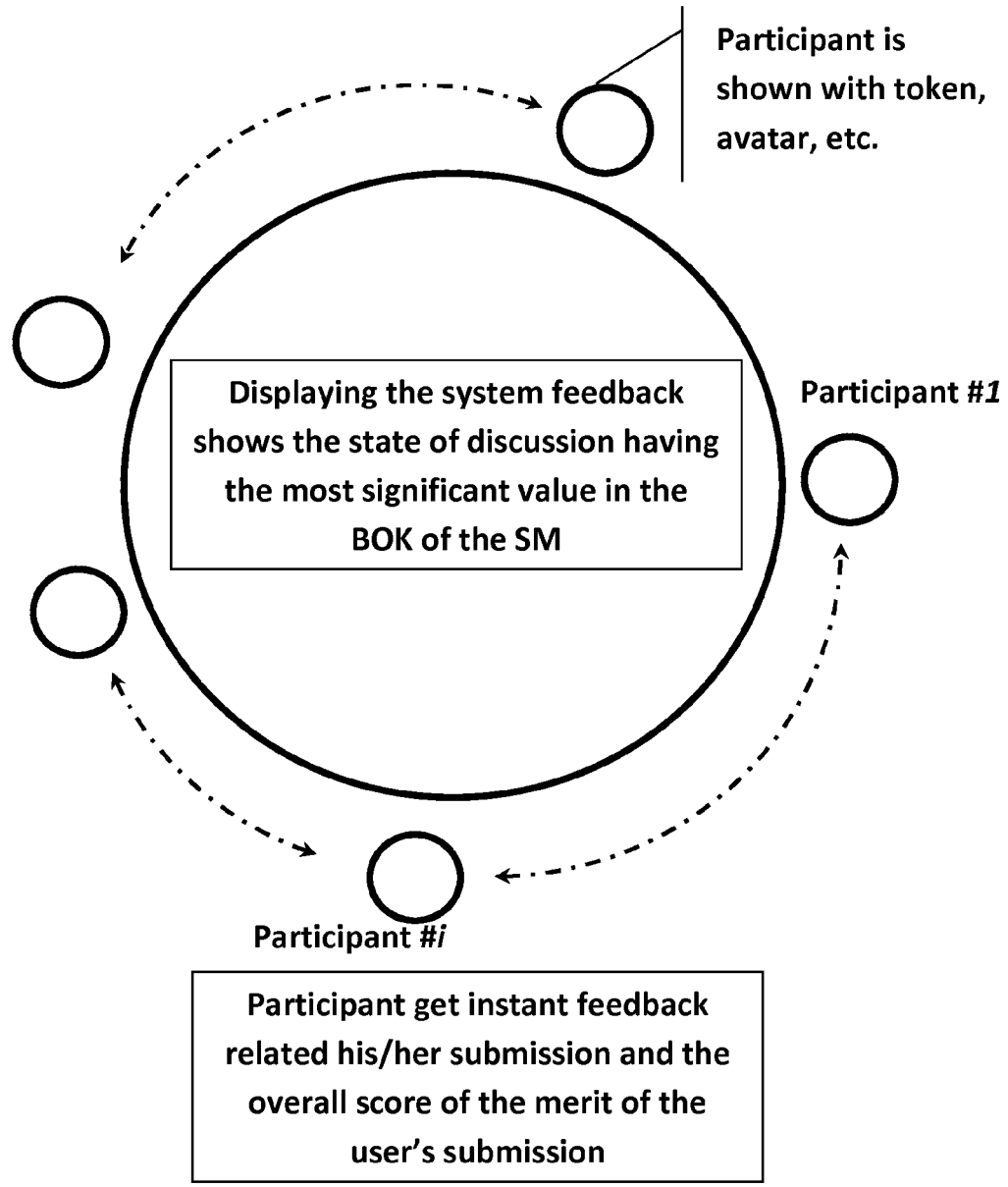
FIG. 10: the ISKDS system will score the input from the participants in the context of the assembled BOK related to the subject matter.

In FIG. 10, the system evaluates the VSM of each user's input (which is in the form of short statements, paragraphs, a document or in general any composition) in the context of the session's BOK and measure the value of the user's input. The higher the value the higher the degree of consensus of past and present and the assembled BOK about the content of user's input. When something novel is expressed about the SM of the session (i.e. the main SM of the session) it is also evaluated and is placed at the fresh contents of the session until there is enough content for comparison and to reach to a scored measure based on the users' input and contribution toward adding new knowledge about the novel subject matter in the context of the session's BOK or as a separate independent session. Therefore in FIG. 10 the system is designed as such to undertake a contest in order to add and validate existing and new knowledge about a subject matter. The contest can have a prize or reward in the form of monetary valuable notes or goods or equivalents. The users can submit their content, short and long, and take part in the contest or get an instant feedback on the quality and substance of their composed content in comparison to the knowledge in the body of the knowledge available for the subject matter/s of the submitted content.

The system may further measure the impact of a user's contribution to the body of knowledge by observing the changes in the value significance of the partitions of the body of knowledge as a result of one's input. The measure of impact in general can be estimated by a function of the variations in the value significances of the partitions of the body of knowledge after a predetermined number of user's input from one or more user and/or a predetermined time interval. Such a measure of impact is indicative of the one's contribution importance in terms of changing the context of the body of knowledge over time as result of new findings that were initiated by one's added input to the body of knowledge of session.

The number of participants can be very large and the system provides the latest findings about the subject matter of the interest to each participant. In this case the system will act as a mediator. The participants can be the registered users competing with each other to provide a higher value contribution thereby giving the people the incentive and motivation to participate. The system can provide the incentive to the contributing participants in the form of credit or monetary valuable scores, notes, coupons, etc.

Third party can also provide incentives for knowledge discovery sessions. For instance an enterprise can introduce a prize or incentive to the contributors of knowledge discovery sessions related to the subject matters that are important for that enterprise. The system is able to measure the significance of a contribution again using the technology and system and method disclosed in this invention and also from the incorporated referenced patent applications.

In another application consider that a user have collected a number of documents and contents and would like to search within that collection or body of knowledge (BOK). The current keyword searching methods alone will not work here since the collection might be large and for any given keyword, especially for the dominant keywords of the BOK, there will be found many statements or partitions that contain the keyword but might not have any real knowledge significance or information value. The presented system and method here along with the methods and teachings of the referenced patent applications always presents the most significant partitions of the BOK in response to a query from user for finding the information from the BOK. Again the system moreover will provide a backbone graph indicating the relationships between the concepts and entities of the BOK and therefore visualizes the true context of the BOK and therefore the context of the universe of the body of knowledge is revealed.

Figure 11:
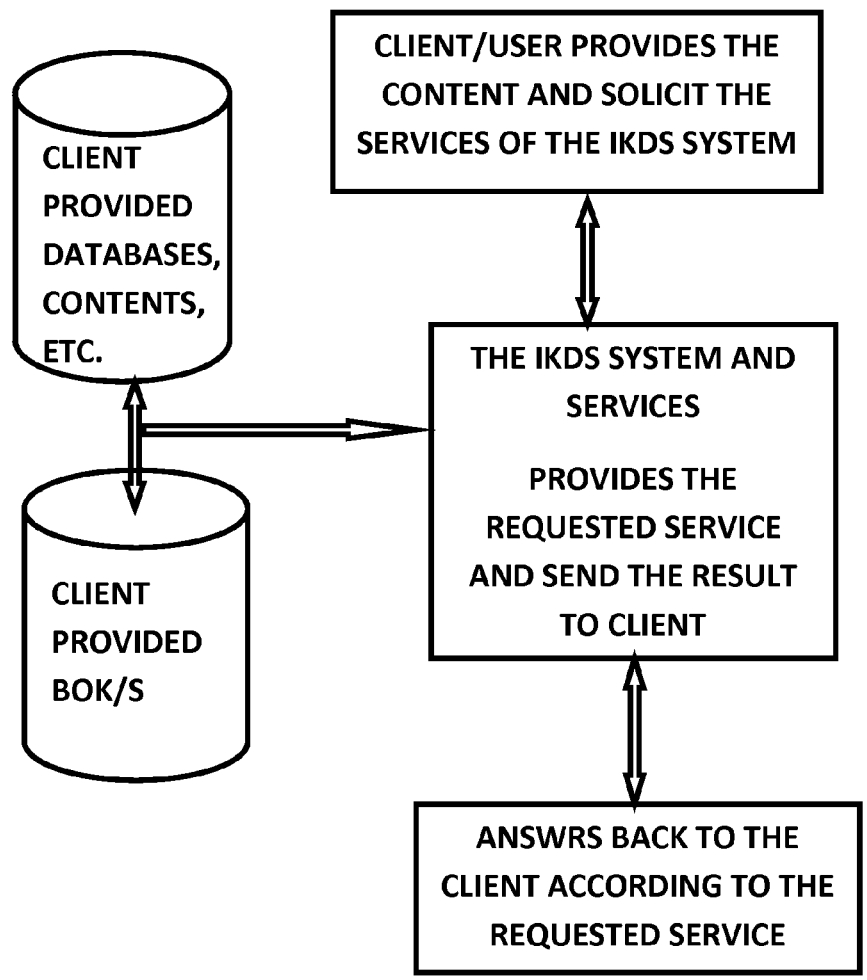
FIG. 11: The ISKDS system in which the client provides the content, databases to build a BOK from or have a BOK for knowledge discovery session.

In FIG. 11, another exemplary system of ISKDS in which the client provides the content or the BOK. Client could assemble a BOK and then use the system to start the interactive session services, or provide the databases for the system to build the BOK. For instance, a researcher or an enterprise can put some or all of his/it's files or documents together and use the ISKDS system to find out the context of his documents, and/or gain knowledge of the whole corpus in a glance or by asking more specific questions from the system to find and become beware of important subject matters of his/it's data. For instance an attorney can put all his document related to a case and quickly get a result of the most important and valuable partitions and statements of the this legal corpus or the BOK. However in this case the client might not know the subject matter and would like to us the ISKDS system to find out the important subject mattes of his own data and then dig further inside these collections to get insight and answers about and from his own data.

Another usage and application of such embodiments beside individual users, as an individual researcher or knowledge seeker or student or trainee, is that large number of people can participate to produce new knowledge or compose a new and more valuable composition. For instance editorial articles can be added to the knowledge database. The content further can be shared or published in one of the publishing shops (as was introduced in the application Ser. No. 12/179, 363, filed on Jul. 24, 2008, i.e. the published US patent application US 200930030897 filed by the same applicant) or other media.

Figure 12:
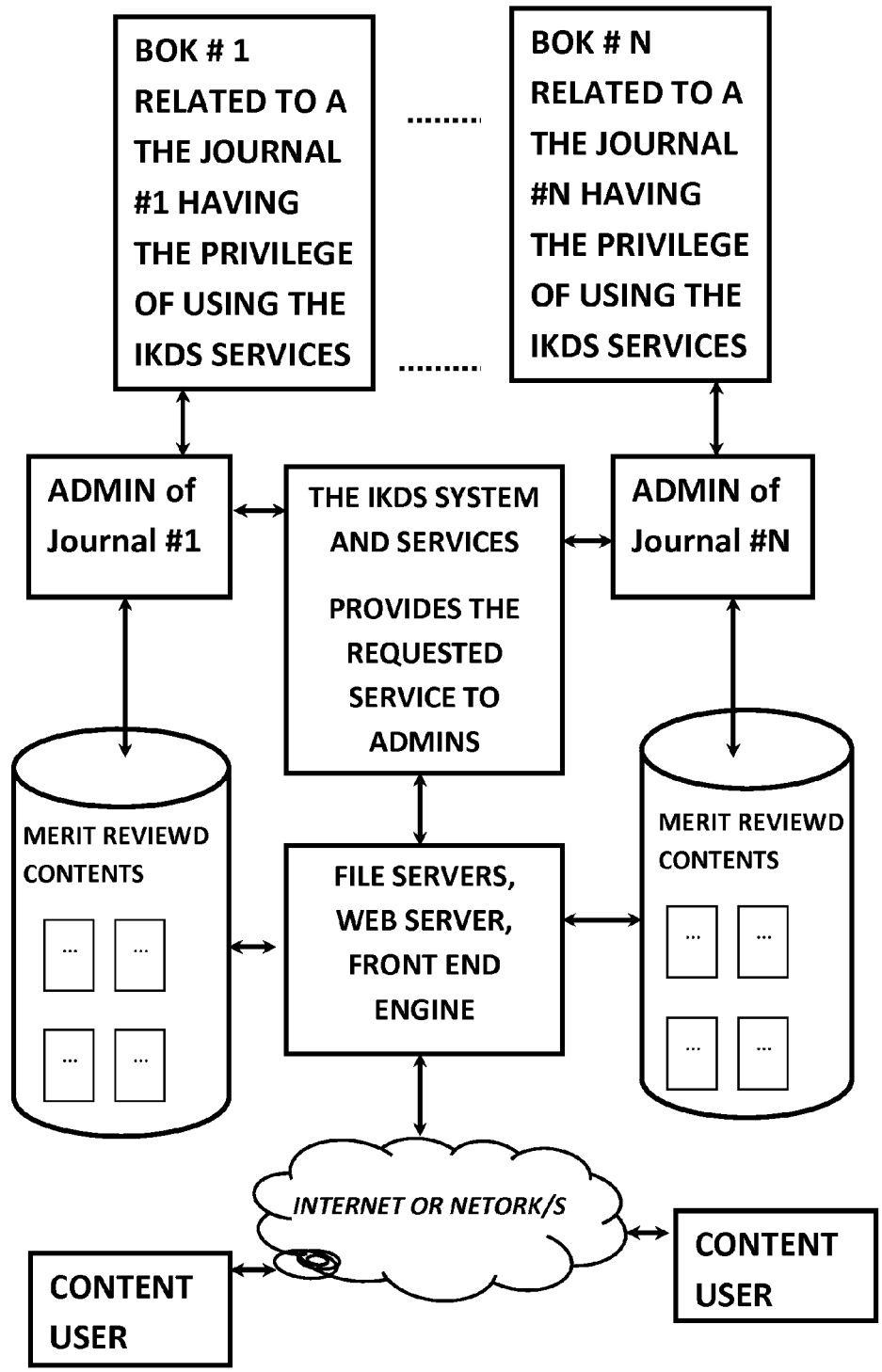
FIG. 12: shows a block diagram of the publication system by the users and clients using the services of the ISKDS.

In FIG. 12, therefore is shown yet another embodiment in which a user can create his own journal and submit and solicit contents, the system then assemble a BOK (with or without the help of the user or other users) for that subject matter submitted by the user.

In FIG. 12 users can create their own journal and submitting content/s, the user or the system assembles a BOK for the SM/s of the submitted content by the user to be evaluated in terms of its merit in the context of the BOK related to subject matter. The user can become qualified to establish an online publishing journal by predetermined criteria or conditions. For example, a user can submit a content of his own and the system rank the content against other contents that system can find and assembles from variety of sources such as scientific journal libraries, encyclopedias, internet, and/or by summarizing and evaluating the comments of other users active in the same field as the submitted content, and if the user content value ranks, for instance, in top 10 among the documents of the BOK then the user can obtain the privileges of establishing that journal and enjoy the benefits of the journal such as having a share of ad revenues or the subscription etc. as long as the user can maintain the journal competitive or wishes to continue the journal with the title that come from the main subject matters of the journal. There could be many sorts of arrangements between the vendor executing and implementing the methods of this invention and a user for establishing a journal. For instance, if the user content rank in top ten list of the most valuable contents in the context of the assembled BOK then user have the option to claim that journal (in accordance with the published patent application US 2009/0030897 disclosures) and enjoys the benefits of the journal such as ad revenue, paid research etc. However still other people can compete to generate other journals on the same subject matter if they become qualified (their submitted content ranks top ten in the context of the assembled BOK related to the subject matter).

The presented system and method in this invention provide services to the information and knowledge searchers and contributor to interactively explore and find their sought after pieces of knowledge while having the confidence that the found information or knowledge have a real significance value in the body of the knowledge of the subject matter of their interests. Also they will be provided with the chance and the service to interact with other searchers of the same subject matter while having a system that mediates the interactive and social knowledge discovery session by evaluating the significances of the contents in the context of existing bodies of knowledge of the subject matter, making sure that the exchanged knowledge or discovered knowledge has a real significance and credibility. Moreover user will achieve his/her goal and perform the searching task at much faster rate leading to much higher productivity and efficiency of knowledge works and professionals as well as general public.

It is apparent to those skilled in the art that such disclosed systems and methods can be executed and implemented in many different ways and configurations and topologies. For example, one or more of the functions can be executed or performed by different processing units in different locations, or in general be scattered around the glob. As an example, in one exemplary implementation of the systems and methods of this invention, one computer programming script can run several processing devices in parallel or in a pipelined manner by executing one function or computer program and obtaining the results from one computer program and feed them into another computer program that may be executed by a processing device in distant location from the other processing device/s wherein the processing devices can communicate over a data network using, for example, network interfaces or buses, and networking scripts etc.

A provider of such services, a promoter or a business associate, and/or the vendor facilitating the exchange of data over the data communications networks are considered as the integrator of the disclosed systems and methods. Therefore from this disclosure point of view the system can topologically being summarized in the system (even as simple as a router) that facilitate the exchange of data between the users and at least one of the various parts of the system/s of this invention regardless of the physical locations of the hardware and the associated operations and apparatuses, e.g. site hosting, servers, data storages, engines, marketing, accounting, engineering, etc.

Additionally those familiar with the art can yet envision and use the method and system for many other applications. It is understood that the preferred or exemplary embodiments and examples described herein are given to illustrate the principles of the invention and should not be constructed as limiting its scope. Various modifications to the specific embodiments could be introduced by those skilled in the art without departing from the scope and spirit of the invention as set forth in the following claims.

What is claimed is:

1. A computer implemented method, comprising an implementation using a portion or whole capacity of one or more non-transitory computer readable media with a set of instructions thereon, executable by one or more processing devices, configured, while being or is executed, for providing an interactive knowledge discovery session to a client comprising:
   providing, using one or more data processing or computing devices, an interactive environment to obtain the client's input, said input is useable to indicate a body of knowledge composed of ontological subjects and a form of response from a plurality of forms of responses;
   accessing or building a first one or more data structures corresponding to at least one participation matrix representing participation of a plurality of ontological subjects of a first predefined order into a plurality of partitions or ontological subjects of a second predefined order of said body of knowledge;
   accessing, or building in real time, a second one or more data structures corresponding to association strengths between a plurality of ontological subjects of a predefined order; wherein said association strength is a function of:
      i. probability of occurrences of some of the ontological subjects of the first order in partitions or ontological subjects of a predefined order of the body of knowledge, and
      ii. co-occurrences of some ontological subjects of the first order in some of partitions or ontological subjects of a predefined order;
   accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge;
   providing, using one or more data processing or computing devices, at least one output using one or more partitions and/or one or more ontological subjects of the body of knowledge in response to the client's input, based on the evaluated value significances of the one or more partitions and/or one or more ontological subjects of the body of knowledge and the form of response, and
   being responsive to further inputs.

2. The computer implemented method of claim 1, wherein one or more of the ontological subjects of the partitions are replaced with other ontological subjects.

3. The computer implemented method of claim 1, wherein the client's input is based on the response of previous input.

4. The computer implemented method of claim 1, wherein the body of knowledge includes the client's input.

5. The computer implemented method of claim 1, wherein the output contains one or more of the followings:
   i. summary of the body of knowledge,
   ii. bulleted summary of the body of knowledge,
   iii. dense summary of the body of knowledge,
   iv. query specific summary from the body of knowledge,
   v. graphs of associated subject matters and/or ontological subject maps built from the body of knowledge,
   vi. content composition, generated in demand based on a query, from the body of knowledge,
   vii. content containing two or more ontological subjects of the body of knowledge,
   viii. answers to questions, said answer extracted and composed using the ontological subjects or partitions of the body of knowledge,
   ix. list of ranked partitions from the body of knowledge,
   x. novel information about the queried subject matter in the context of the body of knowledge,
   xi. a content suggesting a query,
   xii. a content proposing an idea,
   xiii. a content proposing one or more questions,
   xiv. a content proposing a research trajectory,
   xv. a content including one or more novel part of the body of knowledge,
   xvi. credible summary according to an updated state of knowledge in the body of knowledge and/or the client's input.

6. The computer implemented method of claim 5, wherein content of said output is embodied in a program instructions, executable by at least one processor, configured to cause the content being displayed in a predefined format on the client's display.

7. The computer implemented method of claim 1, wherein the at least one of the value significances is an indication of one or more or any combination of the following significance aspect of the partition and/or the ontological subjects:
   credibility,
   novelty,
   density significance,
   recentness,
   informational value.

8. The computer implemented method of claim 1, wherein the body of knowledge contains news content.

9. The computer implemented method of claim 1, wherein the interactive environment includes a graphical user interface.

10. The computer implemented method of claim 9, wherein the client's input is given by pointing and/or selecting graphical objects on a display.

11. The computer implemented method of claim 9, wherein the graphical user interface is a cognitive graph comprising selectable or point-able graphical objects, wherein said graph represents a context for the body of knowledge.

12. A computer implemented method, comprising an implementation using a portion or whole capacity of one or more non-transitory computer readable media with a set of instructions thereon, executable by one or more processing devices, configured, while being or is executed, for representing a context for a body of knowledge by at least one graph comprising:

accessing or building a first one or more data structures corresponding to at least one participation matrix representing participation of ontological subjects of a first predefined order into partitions or ontological subjects of a second predefined order of said body of knowledge;

accessing, or building in real time, a second one or more data structures corresponding to association strengths between a plurality of ontological subjects of a predefined order; wherein said association strength is a function of:
   i. probability of occurrences of some of the ontological subjects of the first order in partitions or ontological subjects of a predefined order of the body of knowledge, and
   ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge;

identifying, using one or more data processing or computing devices, a plurality of ontological subjects of the body of knowledge based on their significance values and/or the association strength between at least two of the ontological subjects of the body of knowledge, and representing the identified ontological subjects graphically, by graphical objects and/or symbols and/or connecting at least two of the associated ontological subjects with graphical links based on their association strength to each other.

13. The computer implemented method of claim 12, wherein data respective of the graph is embedded in a computer program codes that when executed by at least one processor will cause to display the graph on a user's display device.

14. The computer implemented method of claim 13, further comprising a computer graphical user interface that when a user selects and/or points to a graphical object of the graph and/or a link between graphical objects cause to obtain and display, on a user's display device, one or more partition of a body of knowledge respective of the ontological subjects corresponding to the selected or pointed graphical object or the pointed link.

15. The computer implemented method of claim 13, further comprising a computer graphical user interface that when a user select and/or points to one or more graphical object of the graph and/or one or more link between graphical objects cause to obtain data and display, on a user's display device, another graph respective of a plurality of ontological subjects of the body of knowledge having association strength of predefined range to the selected or pointed one or more graphical object and/or the selected one or more link.

16. The computer implemented method of claim 12, wherein the graph includes a chart or has a free form.

17. The computer implemented method of claim 12, wherein the graph is a tree like graph.

18. The computer implemented method of claim 12, wherein the body of knowledge is identified and/or assembled based on a user's query.

19. The computer implemented method of claim 12, further comprising a graphical user interface that a user can point and/or interact and/or select the graphical objects and/or the links between the graphical objects.

20. The computer implemented method of claim 12, further comprising a graphical user interface wherein a user can identify an area of the graph wherein said area contains one or more of the graphical objects and/or one or more of the links between the graphical objects.

21. The computer implemented method of claim 12, further comprising an interactive graph representing the association and/or the association strengths of the graphical objects graphically.

22. The computer implemented method of claim 12, wherein a quantity respective of association strength of two graphical objects is graphically visualized by distance of a graphical object from its associates.

23. The computer implemented method of claim 12, further comprising: making a visually displayable graph or network of graphical objects wherein the graphical objects representing the ontological subjects wherein each graphical object is connected to one or more of other graphical objects having association strength of predefined range of values with that graphical object.

24. The computer implemented method of claim 12, further configured to graphically indicate visually noticeable quantities proportional to the value of association strength of the ontological subjects of the body of knowledge to each other and/or the number of associated ontological subject depicted in an area of the graph.

25. The computer implemented method of claim 12, wherein the graphical objects includes objects indicative of one or more nodes and one or more edges of a graph.

26. The computer implemented method of claim 25, further comprising a graphical user interfaces that a user can select and/or point to one or more of the nodes or one or more of the edges.

27. The computer implemented method of claim 25, wherein the graphical distance between the nodes is determined by a function of the association strength of the nodes that are connected to each other.

28. A method of social and interactive knowledge discovery service comprising:
receiving one or more inputs from a user through one or more data communication devices;
providing an interactive knowledge discovery session interface for the user to interact with a program module comprising instructions configured, when executed using one or more data processing or computing devices, to perform:
accessing or building a first one or more data structures corresponding to at least one participation matrix representing participation of ontological subjects of a first predefined order into partitions or ontological subjects of a second predefined order of a body of knowledge;
accessing, or building in real time, a second one or more data structures corresponding to association strengths between a plurality of ontological subjects of a predefined order; wherein said association strength is a function of:
i. probability of occurrences of some of the ontological subjects of the first order in partitions or ontological subjects of a predefined order of the body of knowledge, and
ii. co-occurrences of some ontological subjects of the first order in some of partitions or ontological subjects of a predefined order;
accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge;
providing, using one or more data processing or computing devices, at least one output using one or more partitions of the body of knowledge and/or one or more sets of ontological subjects in response to said one or more inputs from the user, based on the evaluated value significances of the one or more partitions and/or one or more ontological subjects of the body of knowledge and the form of response, and
providing an environment for interaction between said program module and/or one or more other users respective of the user's one or more inputs so as to have an interactive and/or social session.

29. The method of claim 28, wherein the interactive environment is further configured to represent a user in the interactive environment by a visual object visible on the display device of at least one of the user.

30. The method of claim 28, wherein the interactive environment is visually displayed on a display device as a virtual roundtable conveying a group discussion environment.

31. The method of claim 28, wherein one or more inputs from one or more users are added to the body of knowledge.

32. The method of claim 28, wherein the program module further provides a score of value significance for at least one partition of a user's input.

33. The method of claim 28, further configured to have an option so that another user with similar interest in the body of knowledge of the social session may join in the session based on said another user's input or query.

34. The method of claim 28, wherein said program module is further configured to provide a plurality of options to a user to obtain one or more content related to the body of knowledge of the session.

35. The method of claim 28, further comprising: enabling the user to edit a composition and/or compose a composition and/or add compositions to the body of knowledge of the session.

36. The method of claim 28, further comprising: providing a reward to at least one user whose input has scored a predefined level of value significance in the body of knowledge of the session.

37. The method of claim 28, further comprising: measuring the impact of a user's contribution to the body of knowledge as a function of the variations in the value significances of the partitions of the body of knowledge after having a predefined number of inputs from one or more users and/or a predefined time interval.

38. The method of claim 28, further comprising: interactively exploring details of the body of knowledge wherein the user input more specific query and obtain at least one respective piece of content in response to the query.

39. The method of claim 38, further comprising: at least one program module comprising instructions executable by at least one processor configured to find at least one preferred research trajectory to a user based on the one or more users' interaction tracks and/or one or more users' past inputs.

40. A method of social knowledge discovery, comprising an implementation using a portion or whole capacity of one or more non-transitory computer readable media with a set of instructions thereon, executable by one or more processing apparatuses, configured, while being or is executed, to perform:

providing, using one or more computing devices, an environment for one or more users to input an initial query for indicating a subject matter for exploration;

guiding a user to at least one interactive and social knowledge discovery session, respective of the user's initial query, wherein the user can input further contents;

providing a social interactive session environment for users indicated similar or associated subject matters for exploration wherein the session has at least one body of knowledge for exploration and can provide a response to one or more users' input to the session by:

accessing or building a first one or more data structures corresponding to at least one participation matrix representing participation of ontological subjects of a first predefined order into partitions or ontological subjects of a second predefined order of a body of knowledge;

accessing, or building in real time, a second one or more data structures corresponding to association strengths between a plurality of ontological subjects of a predefined order; wherein said association strength is a function of:

i. probability of occurrences of some of the ontological subjects of the first order in partitions or ontological subjects of a predefined order of the body of knowledge, and ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and composing, using one or more data processing or computing devices, a response using one or more partitions of the body of knowledge or one or more sets of ontological subjects, based on the evaluated value significances of the one or more partitions and/or one or more ontological subjects of the body of knowledge.

41. The method of claim 40, further providing a mediating environment by scoring a user's input in terms of at least one aspect of its value significance thereby said users exploring similar subject matters are informed about the significance of a user's input and accordingly participate in an interactive and social knowledge exploration session by further adding or inputting content.

42. The method of claim 41, wherein a user is further provided with an option to be notified about the new finding in the body of knowledge of a session after leaving the interactive and social session.

43. A method of social search and/or social interactive knowledge discovery comprising an implementation using a portion or whole capacity of one or more non-transitory computer readable media with a set of instructions thereon, executable by one or more processing apparatuses, configured, while being or is executed, to perform:

providing, using one or more data processing or computing devices, a searching utility environment wherein a participant can input a query or content;

providing an interactive knowledge discovery session related to a body of knowledge in response to a participant's input to the searching utility;

providing a social and interactive environment for one or more participants wherein at least one participant can input content;

accessing or building a first one or more data structures corresponding to at least one participation matrix representing participation of ontological subjects of a first predefined order into partitions or ontological subjects of a second predefined order of a body of knowledge;

accessing, or building in real time, a second one or more data structures corresponding to association strengths between a plurality of ontological subjects of a predefined order; wherein said association strength is a function of:

i. probability of occurrences of some of the ontological subjects of the first order in partitions or ontological subjects of a predefined order of the body of knowledge, and ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and providing, using one or more data processing or computing devices, a content viewable by one or more participants based on one or more inputs from one or more participants in the session or using one or more sets of ontological subjects or one or more partitions of the body of knowledge based on the evaluated value significances of the one or more partitions and/or one or more ontological subjects of the body of knowledge.

44. The method of claim 43, wherein one of the participants is an intelligent agent that provides dynamic contents in response to a participant's input.

45. The method of claim 44, wherein the agent is a program module comprising instructions executable by one or more processors configured to perform:

identifying a body of knowledge related to a participant's input, and analyzing the participant's input and providing a respective response using one or more partition of the body of knowledge having at least one predefined type of relationship with the participant's input.

46. The method of claim 45, wherein the agent further configured to score value significance of a user's input, according to at least one value significance measure.

47. The method of claim 45, wherein the agent updates the body of knowledge related to a subject matter in a predefined time intervals and/or according to a participant's input.

48. The method of claim 45, wherein the agent further provides content comprising embedded content and instruction codes executable by one or more processors configured to display the embedded content on the participant's display device in a pre-programmed format.

49. The method of claim 45, wherein the agent further mediates the one or more participants by way of scoring a participant's input in terms of at least one aspect of significance and/or relevancy using content existed in the body of knowledge.

50. The method of claim 45, further configured in such a way that a participant can establish an online journal and the agent provides assistance to evaluate the value of the inputs in respect to the content existed in the body of knowledge.

51. The method of claim 43, wherein said content includes the latest state of the knowledge having predefined level of value significance related to at least one significance aspect of the content in the body of knowledge.

52. The method of claim 43, further configured to provide a reward to at least one participant.

53. The method of claim 43, wherein at least one participant is a registered user.

54. The method of claim 43, further configured in such a way that a third party can provide an incentive for providing content in respect to a subject matter or another content.

55. The method of claim 43, wherein the content is shared and/or published by one or more of the participants in a predetermined medium.

56. The method of claim 43, wherein a session is started for producing new contents.

57. The method of claim 56, wherein the new content is a multimedia.

58. A system of providing at least one service over a data network comprising:
- at least one software module comprising instructions, executable by one or more processors, configured, using one or more data processing or computing devices, to create an interactive session environment for obtaining an input from a user;
- at least one first program comprising instructions, executable by one or more processors, configured to access at least one content, said at least one content is the output of at least one second program comprising instructions, executable by one or more processors, configured to perform:
  - accessing or building a first one or more data structures corresponding to at least one participation matrix representing participation of ontological subjects of a first predefined order into partitions or ontological subjects of a second predefined order of a body of knowledge;
  - accessing, or building in real time, a second one or more data structures corresponding to association strengths between a plurality of ontological subjects of a predefined order; wherein said association strength is a function of:
    i. probability of occurrences of some of the ontological subjects of the first order in partitions or ontological subjects of a predefined order of the body of knowledge, and
    ii. co-occurrences of some ontological subjects of the first order in some of partitions or ontological subjects of a predefined order;
  - accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge;
  - providing, using one or more data processing or computing devices, a content according to the user's input using one or more partitions of the body of knowledge based on the evaluated value significances of the one or more partitions and/or one or more ontological subjects of the body of knowledge; and
- at least one server computer, having at least one processing device, to respond to a user's input over a network.

59. The system of claim 58, wherein the body of knowledge is accessed based on the user's input and/or is provided by the user.

60. The system of claim 58, further comprising instructions, executable by one or more processors, configured to send the content over the network.

61. The system of claim 58, wherein the at least one second program further comprising instructions, executable by one or more processors, configured to display an interactive graphical interface representing a cognitive map of the body of knowledge on the user's display device.

62. The system of claim 58, wherein said body of knowledge contains one or more news content.

63. The system of claim 58, wherein the data network is internet.

64. A system for providing interactive knowledge discovery service to a client or user comprising:
- a receiving module configured to receive an input from a client or user over a data network;
- an access module, comprised of at least one non-transitory computer-readable storage medium having computer executable instructions thereon and/or one or more processing apparatuses and/or one or more data communication devices, providing access to at least one processing device and/or at least one non-transitory computer-readable storage medium over a first network;
- a facilitating module facilitating access to at least one content corresponding to the client's or user's input, said at least one content is an output of at least one software module executed using one or more processing devices and/or one or more computer-readable storage medium over a second network to perform:
  - accessing or building a first one or more data structures corresponding to at least one participation matrix representing participation of ontological subjects of a first predefined order into partitions or ontological subjects of a second predefined order of a body of knowledge;
  - accessing, or building in real time, a second one or more data structures corresponding to association strengths between a plurality of ontological subjects of a predefined order; wherein said association strength is a function of:
    i. probability of occurrences of some of the ontological subjects of the first order in partitions or ontological subjects of a predefined order of the body of knowledge, and
    ii. co-occurrences of some ontological subjects of the first order in some of partitions or ontological subjects of a predefined order;
  - accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and
  - providing, using one or more data processing or computing devices, a content according to the client's or user's input using one or more partitions of the body of knowledge based on the evaluated value significances of the one or more partitions and/or one or more ontological subjects of the body of knowledge.

65. The system of claim 64, wherein said data network is the internet.

66. The system of claim 65, wherein at least one of the processing apparatus and/or at least one of the storage medium is located in geographically different location than the rest of the system.

67. The system of claim 64, wherein the first network and/or the second network is the internet.

68. The system of claim 64, wherein the second network is a cloud computing network comprising: at least two processing apparatus, at least one non-transitory computer-readable storage medium, and at least one communication link between the processing devices and the at least one storage medium.

69. The system of claim 64, wherein further includes computer-readable storage media, over the first and/or over the second network, to store one or more of the following:
  i. at least one composition as a body of knowledge,
  ii. at least some of the partitions of the at least one composition,
  iii. at least some ontological subjects,
  iv. at least one set of data respective of a value significances of the partitions and/or the ontological subjects of the body of knowledge,
  v. one or more index list of the partitions and the ontological subjects of the body of knowledge,
  vi. at least one pre-made content composition from the body of knowledge,
  vii. at least some of the user's input.

70. The system of claim 64, further configured to score significance of a user's input against the partitions of the body of knowledge.

71. The system of claim 64, wherein a content composition is assembled by said provider of the service in response to the client's input.

72. The system of claim 64, wherein the first and the second network form a single network or are parts of a larger network architecture.

73. A system for providing a service to a client comprising:
  one or more network communication apparatuses, said one or more apparatuses receiving the data initiated from a client over a communication and/or computer network;
  one or more communication apparatuses, said one or more apparatuses exchanging data signals with one or more processing apparatus capable of executing one or more sets of instructions that, when being or is executed, configured to output a composition, comprising:
  accessing at least one body of knowledge and being responsive to the data received from a client;
  accessing or building a first one or more data structures corresponding to at least one participation matrix representing participation of ontological subjects of a first predefined order into partitions or ontological subjects of a second predefined order of the body of knowledge;
  accessing, or building in real time, a second one or more data structures corresponding to association strengths between a plurality of ontological subjects of a predefined order; wherein said association strength is a function of:
    i. probability of occurrences of some of the ontological subjects of the first order in partitions or ontological subjects of a predefined order of the body of knowledge, and
    ii. co-occurrences of some ontological subjects of the first order in some of partitions or ontological subjects of a predefined order;
  accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and
  providing, using one or more data processing or computing devices, a content related to one or more partitions of the body of knowledge that are selected based on the evaluated value significances of the one or more partitions and/or one or more ontological subjects of the body of knowledge; and embedding them in a computer-executable instructions that when executed by the client's computer system cause the client's computer to display the composition on the client's display device.

74. The system of claim 73, further comprising:
  one or more computer servers with network communication apparatus connecting to repositories of compositions or partitions of said compositions, said one or more servers are, or have access to one or more, computer systems that are capable of executing computer program instructions to perform a task; and
  one or more data repositories corresponding to at least one array of data extracted and/or calculated based on data respective of participation patterns of a plurality of constituent ontological subjects of one or more compositions into a plurality of partitions of the one or more compositions.

75. The system of claim 73, wherein the system is distributed and at least one part of the system is physically located in, or performs from, different location from the rest of the system.

76. The system of claim 73, wherein the system is distributed and at least one of the one or more processing apparatus is physically located in, or performs from, different location from the rest of the system.

77. A method of facilitating a service for a client over a communication and/or computer network, comprising:
  providing an access for the client over the network;
  receiving signals or an input from the client, said input can be used to identify the network address of a provider of said service;
  transmitting signals or data toward the provider of said service;
  facilitating for exchanging signals or data between the client and the provider of said service, wherein said service is performed by at least one program comprising instructions, executable by one or more processors, configured to process an input and provides two or more of the following:
    1. providing an interactive environment to obtain the client's input in such a way that said input indicates a respective body of knowledge and a selected form of response from a plurality of forms of responses;
      accessing or building a first one or more data structures corresponding to at least one participation matrix representing participation of ontological subjects of a first predefined order into partitions or ontological subjects of a second predefined order of the body of knowledge;
      accessing, or building in real time, a second one or more data structures corresponding to association strengths between a plurality of ontological subjects of a predefined order; wherein said association strength is a function of:
        i. probability of occurrences of some of the ontological subjects of the first order in partitions or ontological subjects of a predefined order of the body of knowledge, and ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and providing one output related to one or more partitions of the body of knowledge that are selected based on the evaluated value significances of the one or more partitions and/or one or more ontological subjects of the body of knowledge;

2. providing at least one cognitive graph from a body of knowledge by:

identifying, using one or more data processing or computing devices, a plurality of ontological subjects of the body of knowledge based on their significance values and/or the association strength between at least two of the ontological subjects of the body of knowledge, and representing the identified ontological subjects graphically, by graphical objects and/or symbols and/or connecting at least two of the associated ontological subjects with graphical links based on their association strength to each other:

3. accessing to at least one pre-built body of knowledge which has been built in response to a client's request; and 4. providing a social interaction session for users looking for information related to similar or associated subject matters.

78. The method of claim 77, wherein the network is the internet.

79. The method of claim 77, wherein the body of knowledge is provided by the client.

80. A non-transitory computer-readable storage medium with an executable program, comprises of one or more sets of instructions, stored thereon, wherein the program configured, when being or is executed, to instruct one or more processors to perform:

providing an interactive environment to obtain a client's input, said input is useable to indicate a body of knowledge composed of ontological subjects and a form of response from a plurality of forms of responses;

accessing or building a first one or more data structures corresponding to at least one participation matrix representing participation of ontological subjects of a first predefined order into partitions or ontological subjects of a second predefined order of the body of knowledge;

accessing, or building in real time, a second one or more data structures corresponding to association strengths between a plurality of ontological subjects of a predefined order; wherein said association strength is a function of:

i. probability of occurrences of some of the ontological subjects of the first order in partitions or ontological subjects of a predefined order of the body of knowledge, and ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge; and providing one output related to one or more partitions of the body of knowledge based on the evaluated value significances of the one or more partitions and/or one or more ontological subjects of the body of knowledge and the selected form of response, and being responsive to further inputs.

81. The non-transitory computer-readable storage medium of claim 80, wherein the body of knowledge includes one or more of inputs from one or more clients.

82. The non-transitory computer-readable storage medium of claim 80, wherein the at least one of the value significances is an indication of one or more and/or any combination of the following significance aspect of the partition and/or the ontological subjects:

credibility;
novelty;
density significance;
recentness; and
informational value.

83. The non-transitory computer-readable storage medium of claim 80, wherein the body of knowledge includes news content.

84. The non-transitory computer-readable storage medium of claim 80, wherein the interactive environment includes a graphical user interface, wherein the client's input is given by pointing and/or selecting graphical objects on a display.

85. The non-transitory computer-readable storage medium of claim 84, wherein the graphical user interface is a cognitive graph comprising selectable or point-able graphical objects, wherein said graph represents a context for the body of knowledge.

86. A non-transitory computer-readable storage medium with an executable program comprises of one or more sets of instructions stored thereon, wherein the program configured, when being or is executed, to instruct one or more processors to perform:

receiving a request and/or a query from a user;

providing an interactive knowledge discovery session interface for the user to interact with a computer program module having instructions embodied thereon, executable by at least one processor configured to perform:

accessing or building a first one or more data structures corresponding to at least one participation matrix representing participation of ontological subjects of a first predefined order into partitions or ontological subjects of a second predefined order of a body of knowledge;

accessing, or building in real time, a second one or more data structures corresponding to association strengths between a plurality of ontological subjects of a predefined order; wherein said association strength is a function of:

i. probability of occurrences of some of the ontological subjects of the first order in partitions or ontological subjects of a predefined order of the body of knowledge, and ii. co-occurrences of some ontological subjects of the first order in some of partitions or ontological subjects of a predefined order;

accessing evaluated, or evaluating in real time, value significances for one or more partitions or one or more ontological subjects of the body of knowledge, based on data of one or more of said first and second one or more data structures and in respect to at least one significance aspect of the one or more partitions or one or more ontological subjects of the body of knowledge;

providing, using one or more data processing or computing devices, at least one output using one or more partitions and/or one or more ontological subjects of the body of knowledge in response to said one or more inputs from the user, based on the evaluated value significances of the one or more partitions and/or one or more ontological subjects of the body of knowledge, and the form of response, and providing an environment for interaction between said program module and/or one or more other users respective of the user's one or more inputs so as to have an interactive and/or social session.

87. The non-transitory computer-readable storage medium of claim 86, wherein the interactive environment is further configured to represent a user in the interactive environment by a visual object visible on the display apparatus of at least one of the user.

88. The non-transitory computer-readable storage medium of claim 86, wherein one or more inputs from one or more users are added to the body of knowledge.

89. The non-transitory computer-readable storage medium of claim 86, wherein the program further provides a score of value significance for at least one partition of a user's input.

90. The non-transitory computer-readable storage medium of claim 86, further configured to have an option so that another user with similar interest in the body of knowledge of the social session may join in the session based on said another user's input and/or query.

91. The non-transitory computer-readable storage medium of claim 86, wherein said program is further configured to provide a plurality of options to a user to obtain one or more content related to the body of knowledge of the session.

92. The non-transitory computer-readable storage medium of claim 86, further comprising at least one program comprising instructions executable by at least one processor configured to find at least one preferred research trajectory to a user based on the users' interaction tracks and/or users' past inputs.

93. The non-transitory computer-readable storage medium of claim 86, further comprising: providing a reward to at least one user whose input has scored a predefined level of value significance in the body of knowledge of the session, wherein the body of knowledge includes the user's input.

94. The non-transitory computer-readable storage medium of claim 86, further comprising at least one program comprising instructions executable by at least one processor configured to find at least one preferred research trajectory to a user based on one or more users' interaction tracks and/or one or more users' past inputs.

\* \* \* \* \*